(12) United States Patent
Kwak et al.

(10) Patent No.: US 11,256,250 B2
(45) Date of Patent: Feb. 22, 2022

(54) PLURALITY OF AUTONOMOUS MOBILE ROBOTS AND CONTROLLING METHOD FOR THE SAME

(71) Applicant: LG Electronics Inc., Seoul (KR)

(72) Inventors: Donghoon Kwak, Seoul (KR); Kyoungsuk Ko, Seoul (KR); Sungwook Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 240 days.

(21) Appl. No.: 16/559,030

(22) Filed: Sep. 3, 2019

(65) Prior Publication Data

US 2020/0264603 A1 Aug. 20, 2020

(30) Foreign Application Priority Data

Feb. 20, 2019 (KR) .................. 10-2019-0020080

(51) Int. Cl.

| | | |
|---|---|---|
| *G05D 1/00* | (2006.01) | |
| *G05D 1/02* | (2020.01) | |
| *G01S 13/02* | (2006.01) | |
| *A47L 11/40* | (2006.01) | |
| *B25J 11/00* | (2006.01) | |

(52) U.S. Cl.
CPC ........ *G05D 1/0027* (2013.01); *A47L 11/4069* (2013.01); *B25J 11/0085* (2013.01); *G01S 13/0209* (2013.01); *G05D 1/0022* (2013.01); *G05D 1/0219* (2013.01); *G05D 1/0295* (2013.01); *A47L 2201/04* (2013.01); *G05D 2201/0215* (2013.01)

(58) Field of Classification Search
CPC ............. G05D 1/00; G05D 1/02; G01S 13/02
See application file for complete search history.

(56) References Cited

U.S. PATENT DOCUMENTS

2004/0204804 A1   10/2004   Lee et al.
2004/0210346 A1*  10/2004   Lee .................. G06N 3/008
                                                700/245
(Continued)

FOREIGN PATENT DOCUMENTS

CN      103522304 A    1/2014
CN      105686766 A    6/2016
(Continued)

OTHER PUBLICATIONS

Office Action in Taiwanese Patent Application No. 108131941, dated Jun. 2, 2019 (13 pages).
(Continued)

*Primary Examiner* — Kira Nguyen
(74) *Attorney, Agent, or Firm* — Finnegan, Henderson, Farabow, Garrett & Dunner LLP

(57) ABSTRACT

The present disclosure relates to a plurality of autonomous mobile robots. A plurality of autonomous mobile robots comprise a first mobile robot including an antenna configured to transmit and receive signals, and a second mobile robot including a first antenna and a second antenna disposed on a front area of a main body thereof to transmit and receive signals to and from the antenna of the first mobile robot. The second mobile robot comprises a control unit configured to determine a relative position of the first mobile robot using the signal received by the first antenna and the second antenna.

17 Claims, 15 Drawing Sheets

(56) References Cited

U.S. PATENT DOCUMENTS

| | | | | |
|---|---|---|---|---|
| 2007/0298814 A1* | 12/2007 | Kim | ............................ | G01S 5/12 |
| | | | | 455/456.1 |
| 2014/0203197 A1* | 7/2014 | Jeon | ........................ | G01S 17/74 |
| | | | | 250/557 |
| 2018/0031692 A1* | 2/2018 | Kuo | ........................ | G01S 13/931 |
| 2018/0317725 A1* | 11/2018 | Lee | ........................ | A47L 11/202 |
| 2018/0329433 A1* | 11/2018 | Zhao | ........................ | G05D 1/0276 |
| 2019/0212441 A1* | 7/2019 | Casner | ................ | G05D 1/0088 |

FOREIGN PATENT DOCUMENTS

| | | |
|---|---|---|
| CN | 205942412 U | 2/2017 |
| CN | 206473273 U | 9/2017 |
| CN | 107479544 A | 12/2017 |
| CN | 206850525 U | 1/2018 |
| CN | 108420371 A | 8/2018 |
| CN | 108903832 A | 11/2018 |
| JP | 2003-332821 A | 11/2003 |
| JP | 2005-192609 A | 7/2005 |
| KR | 10-2006-0111780 A | 10/2006 |
| KR | 10-0769673 B1 | 10/2007 |
| KR | 10-1155500 B1 | 6/2012 |
| KR | 10-1255024 B1 | 4/2013 |
| KR | 10-2014-0094259 A | 7/2014 |
| KR | 10-2016-0133348 A | 11/2016 |
| TW | 201722336 A | 7/2017 |
| WO | WO 2017/036532 A | 3/2017 |
| WO | WO 2017/036532 A1 | 3/2017 |

OTHER PUBLICATIONS

PCT Search Report received from the Korean Intellectual Property Office (KIPO) in PCT Application No. PCT/KR2019/011275, dated Dec. 17, 2019 (10 pages).

Office Action in Korean Patent Application No. 10-2019-02080, dated Sep. 11, 2020 (6 pages).

* cited by examiner

FIG. 7A
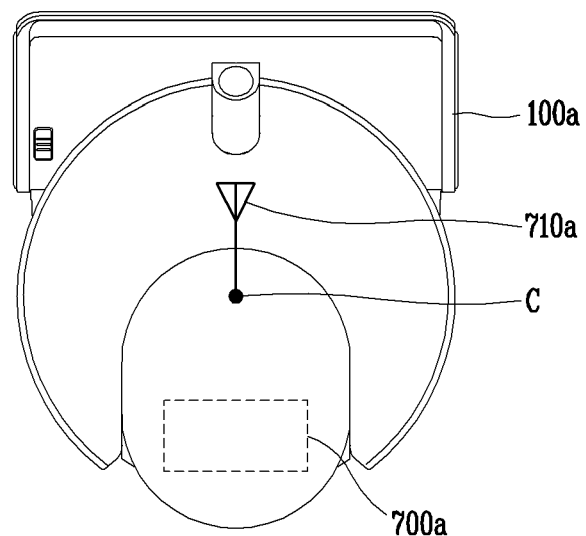
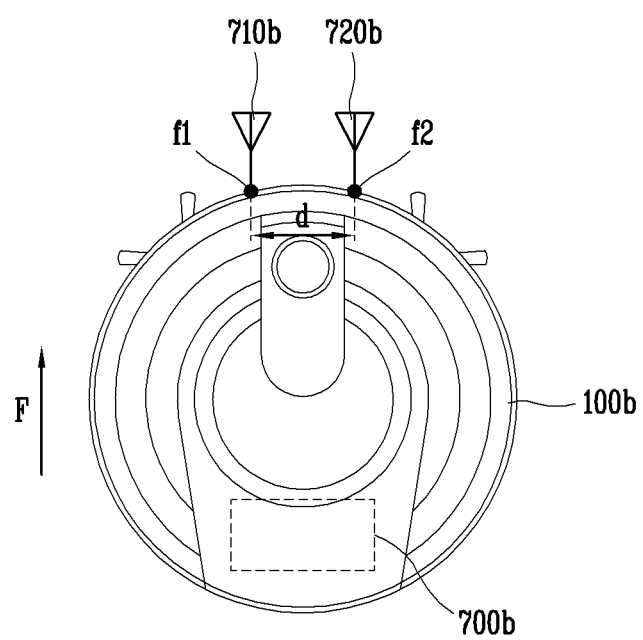

PLURALITY OF AUTONOMOUS MOBILE ROBOTS AND CONTROLLING METHOD FOR THE SAME

CROSS-REFERENCE TO RELATED APPLICATION

This application claims the benefit of priority to Korean Patent Application No. 10-2019-0020080, filed on Feb. 20, 2019, the disclosure of which is herein incorporated by reference in its entirety.

BACKGROUND OF THE DISCLOSURE

1. Technical Field

The present disclosure relates to a plurality of autonomous mobile robots.

2. Description of the Related Art

Generally, a mobile robot is a device that automatically performs a predetermined operation while traveling by itself in a predetermined area without a user's operation. The mobile robot senses obstacles located in the area and performs its operations by moving close to or away from such obstacles.

Such mobile robot may include a robot cleaner that performs cleaning while traveling in an area.

The robot cleaner is a cleaner that performs cleaning while traveling by itself without a user's operation.

In this manner, with the development of such mobile robots capable of performing cleaning while traveling by themselves without users' operations, there is a need to make a plurality of mobile robots perform cleaning in a collaborating manner without users' operations.

The prior art document WO2017-036532 discloses a method in which a master robot cleaner (hereinafter, referred to as a master robot) controls at least one slave robot cleaner (hereinafter, referred to as a slave robot).

The prior art document discloses a configuration in which the master robot detects adjacent obstacles by using an obstacle detection device and determines its position relative to the slave robot using position data derived from the obstacle detection device.

In addition, the prior art discloses a configuration in which the master robot and the slave robot perform communication with each other via a server using wireless local area network (WLAN) technology.

According to the prior art document, the master robot can determine the position of the slave robot but the slave robot cannot determine the position of the master robot.

Further, in order for the slave robot to determine (decide) the position of the master robot using the configuration disclosed in the prior art document, the master robot must transmit relative position information regarding the slave robot determined by the master robot to the slave robot through the server.

However, the prior art fails to disclose such a configuration in which the master robot transmits relative position information to the slave robot via the server.

In addition, even if it is assumed that the master robot transmits relative position information, the master robot and the slave robot communicate only through the server. Accordingly, such communication with the server may be disconnected when the master robot or the slave robot is located at a place where it is difficult to communicate with the server.

In this case, since the slave robot cannot receive the relative position information from the server, it may be difficult for the slave robot to decide (determine) the relative position of the master robot, which may prohibit smooth following control of the master robot and the slave robot.

In order to perform smooth following control through communication between a plurality of autonomous mobile robots, it is necessary to determine whether the master robot is located at the front or at the rear of the slave robot, or whether the slave robot is located at the front or at the rear of the master robot.

However, since the prior art document merely discloses that the master robot transmits the relative position information to the slave robot through the server, it is impossible to determine whether the master robot is located at the front or at the rear of the slave robot, or whether the slave robot is located at the front or at the rear of the master robot.

SUMMARY OF THE DISCLOSURE

One aspect of the present disclosure is to provide mobile robots, capable of performing cleaning in an optimized manner without a user's intervention, and a control method thereof.

Another aspect of the present disclosure is to provide mobile robots, wherein one of a plurality of mobile robots follows another robot of the plurality of mobile robots in an optimized manner, and a control method thereof.

Still another aspect of the present disclosure is to provide mobile robots capable of recognizing relative positions of a plurality of mobile robots, irrespective of a communication state between the plurality of mobile robots and a server, and a control method thereof.

Still another aspect of the present disclosure is to provide mobile robots capable of recognizing relative positions of a plurality of mobile robots, by using only the least number of components and low costs, and a control method thereof.

Still another aspect of the present disclosure is to provide mobile robots, each of which is configured to recognize a location of another robot with respect to the front so as to perform smooth following control, and a control method thereof.

To achieve the aspects and other advantages of the present disclosure, there is provided a plurality of autonomous mobile robots, including a first mobile robot having an antenna configured to transmit and receive a signal, and a second mobile robot having a first antenna and a second antenna disposed on a front area of a main body thereof, the first antenna and the second antenna being configured to transmit and receive signals to and from the antenna of the first mobile robot. The second mobile robot may comprise a control unit configured to determine a relative position of the first mobile robot using the signal received by the first antenna and the second antenna.

In an embodiment disclosed herein, the first antenna and the second antenna may be disposed to be symmetric to each other in right and left directions with respect to the front area of the main body.

In an embodiment disclosed herein, the first antenna and the second antenna may be configured to receive signals transmitted in directions except for a direction traveling from the front area of the main body through the main body.

In an embodiment disclosed herein, an intensity of the signal received in the first antenna or the second antenna may be reduced when the signal is received through the main body.

In an embodiment disclosed herein, an intensity of the signal received in the first antenna and the second antenna without passing through the main body after being output from the one antenna of the first mobile robot may be stronger than an intensity of the signal received in the first antenna and the second antenna through the main body after being output from one the antenna of the first mobile robot.

In an embodiment disclosed herein, the control unit of the second mobile robot may be configured to output a first signal to the first mobile robot through at least one of the first antenna or the second antenna, receive a second signal output from the one antenna of the first mobile robot in each of the first antenna and the second antenna, and determine a first distance between the one antenna of the first mobile robot and the first antenna and a second distance between the antenna of the first mobile robot and the second antenna when the second signal is received in the first antenna and the second antenna.

In an embodiment disclosed herein, the control unit of the second mobile robot may be configured to determine a first distance between the one antenna of the first mobile robot and the first antenna and a second distance between the one antenna of the first mobile robot and the second antenna, based on the signals transmitted and received through the antenna of the first mobile robot and the first antenna and the second antenna of the second mobile robot, and determine two intersections between a first circle and a second circle. A radius of the first circle may correspond to the first distance and a center of the first circle may correspond to the first antenna. A radius of the second circle may correspond to the second distance and a center of the second circle may correspond to the second antenna.

In an embodiment disclosed herein, the control unit of the second mobile robot may be configured to determine the relative position of the first mobile robot based on an intensity of the signal received through the first antenna and the second antenna.

In an embodiment disclosed herein, the control unit of the second mobile robot may be configured to determine two intersections between a first circle and a second circle. A radius of the first circle may correspond to a first distance between the antenna of the first mobile robot and the first antenna and a center of the first circle may correspond to the first antenna. A radius of the second circle may correspond to a second distance between the antenna of the first mobile robot and the second antenna and a center of the second circle may correspond to the second antenna. The control unit may be configured to determine an intersection located at a front of the second mobile robot of the two intersections as the relative position of the first mobile robot when the intensity of the signal received through the first antenna and the second antenna is equal to or greater than a reference value.

In an embodiment disclosed herein, the control unit of the second mobile robot may be configured to determine an intersection located at a rear of the second mobile robot of the two intersections as the relative position of the first mobile robot when the intensity of the signal received through the first antenna and the second antenna is smaller than the reference value.

In an embodiment disclosed herein, the control unit of the second mobile robot may be configured to determine a position of the antenna of the first mobile robot as the relative position of the first mobile robot.

In an embodiment disclosed herein, the first mobile robot may comprise an Ultra-Wideband (UWB) tag to transmit and receive a UWB signal, and the antenna of the first mobile robot may be electrically connected to the UWB tag.

In an embodiment disclosed herein, the second mobile robot may comprise an Ultra-Wideband (UWB) anchor to transmit and receive a UWB signal, and the first antenna and the second antenna of the second mobile robot may be electrically connected to the UWB anchor.

In an embodiment disclosed herein, the control unit of the second mobile robot may be configured to determine an arrangement state of the first mobile robot and the second mobile robot based on an intensity of the signal received through the first antenna and the second antenna.

In an embodiment disclosed herein, the control unit of the second mobile robot may be configured to determine a direction in which the first mobile robot is located with respect to a front of the second mobile robot, based on a phase difference of the signal received through the first antenna and the second antenna.

In an embodiment disclosed herein, the second mobile robot may include a first Ultra-Wideband (UWB) anchor connected to the first antenna, and a second UWB anchor connected to the second antenna. The control unit of the second mobile robot may be configured to determine a direction information in which the first mobile robot is located with respect to a front of the second mobile robot, based on a phase difference between a signal received by the first UWB anchor through the first antenna and a signal received by the second UWB anchor through the second antenna.

In an embodiment disclosed herein, the control unit of the second mobile robot may be configured to calculate a distance to the first mobile robot, based on signals transmitted and received through at least one of the antenna of the first mobile robot, the first antenna of the second mobile robot, or the second antenna of the second mobile robot, and determine the relative position of the first mobile robot based on the calculated distance and the direction.

To achieve the aspects and other advantages of the present disclosure, there is provided a method for controlling a mobile robot, the method comprising determining a first distance between an antenna of the first mobile robot and a first antenna of the second mobile robot and a second distance between the antenna of the first mobile robot and a second antenna of the second mobile robot, respectively, when a signal is received through the first antenna and the second antenna of the second mobile robot, determining, by the control unit, two intersections between a first circle and a second circle, the first circle having the first distance as a radius and the second circle having the second distance as a radius, and determining, by the control unit, one of the two intersections as the relative position of the first mobile robot based on an intensity of the signal received in the first antenna and the second antenna.

The present disclosure provides a plurality of autonomous mobile robots that a second mobile robot can accurately determine a relative position of a first mobile robot.

The present disclosure provides a plurality of new autonomous mobile robots, capable of reducing costs while improving accuracy in a manner that a second mobile robot determines a relative position of a first mobile robot using one UWB tag, one UWB anchor and the least antennas.

The present disclosure provides a plurality of new autonomous mobile robots, capable of accurately determining a relative position of a first mobile robot using only two receiving antennas, by use of the fact that a signal can be received through a main body and intensity of the signal can be attenuated.

The present disclosure calculates two intersections through a UWB module using a UWB signal and the least antennas, so as to enable calculation of two accurate intersections and determination as to whether a first mobile robot is located at the front or rear of the second mobile robot based on intensity of a signal.

The present disclosure provides a plurality of autonomous mobile robots, capable of allowing smooth following travel by recognizing relative positions thereof irrespective of a communication state with a server because relative positions of a first mobile robot and a second mobile robot can be determined by the first and second mobile robots.

BRIEF DESCRIPTION OF THE DRAWINGS

FIG. 7A is a conceptual view illustrating a plurality of autonomous mobile robots in accordance with an embodiment of the present disclosure.

DETAILED DESCRIPTION OF THE DISCLOSURE

Hereinafter, autonomous mobile robots according to the present disclosure will be described in detail with reference to the accompanying drawings.

Hereinafter, description will be given in detail of embodiments disclosed herein. Technical terms used in this specification are merely used for explaining specific embodiments, and should not be constructed to limit the scope of the technology disclosed herein.

First, the term "mobile robot" disclosed herein may be used as the same meaning as 'robot (for a specific function),' 'robot cleaner,' 'robot for cleaning' and 'autonomous cleaner,' and those terms will be used equally.

A "plurality of mobile robots" disclosed in the present disclosure may be used as a "plurality of robot cleaners" or "a plurality of cleaners". Also, a "first mobile robot" may be named "first robot", "first robot cleaner", "first cleaner", or "leading or master cleaner". Further, a "second mobile robot" may be named as "second robot", "second robot cleaner", "second cleaner", or "following or slave cleaner".

Figure 1:
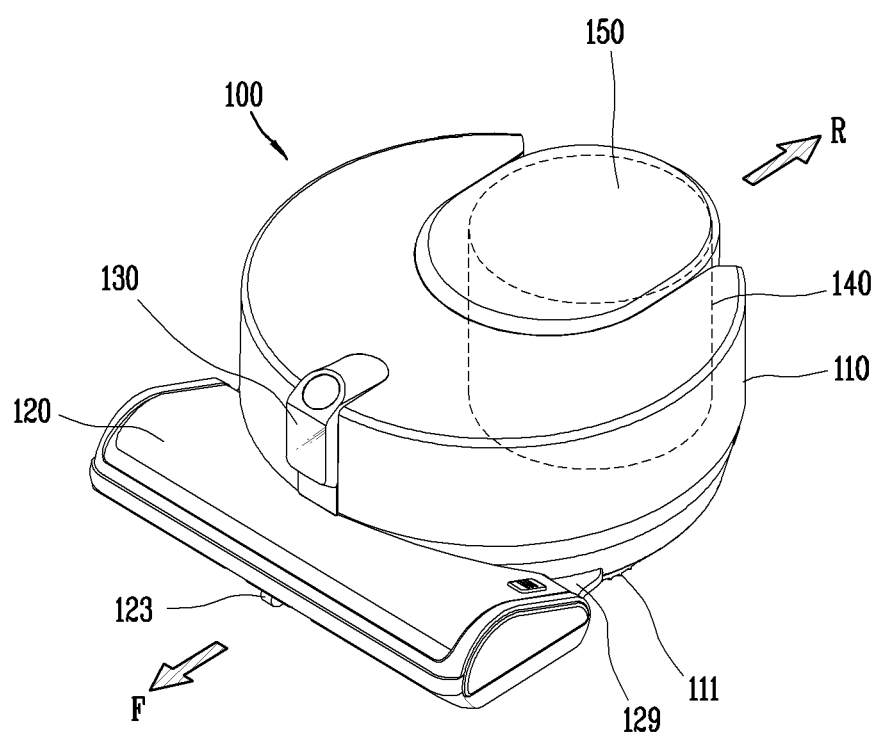
FIG. 1 is a perspective view illustrating one embodiment of a robot cleaner according to an embodiment of the present disclosure.
Figure 2:
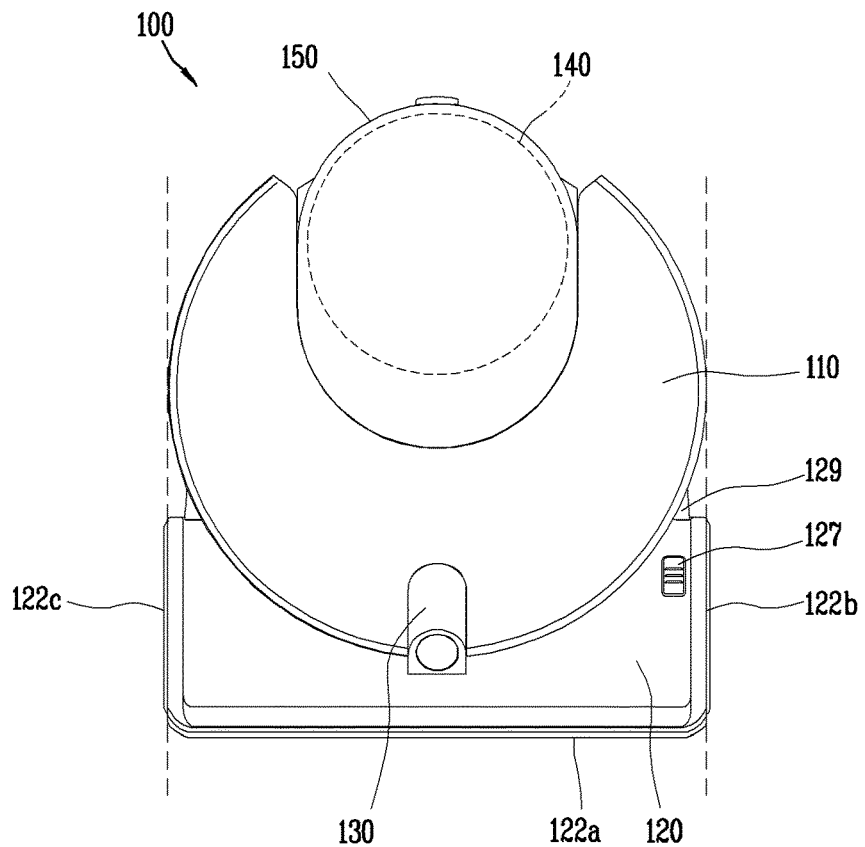
FIG. 2 is a planar view of the autonomous mobile robot illustrated in FIG. 1 according to an embodiment of the present disclosure.
Figure 3:
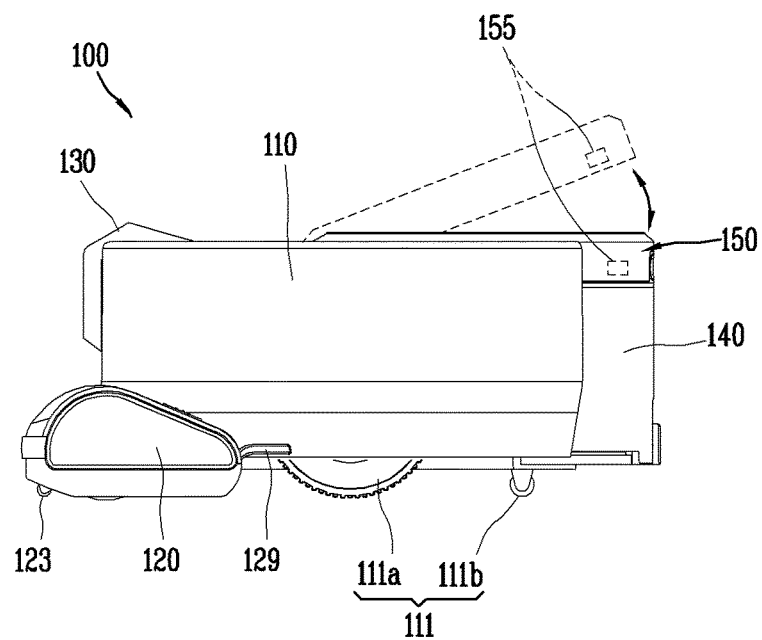
FIG. 3 is a lateral view of the autonomous mobile robot illustrated in FIG. 1 according to an embodiment of the present disclosure.

FIGS. 1 to 3 illustrate a robot cleaner as an example of a mobile robot according to the present disclosure.

FIG. 1 is a perspective view illustrating one embodiment of an autonomous mobile robot 100 according to the present disclosure, FIG. 2 is a planar view of the autonomous mobile robot 100 illustrated in FIG. 1, and FIG. 3 is a lateral view of the autonomous mobile robot 100 illustrated in FIG. 1.

In this specification, a mobile robot, an autonomous mobile robot, and a cleaner that performs autonomous traveling may be used in the same sense. In this specification, a plurality of autonomous mobile robots may include at least part of configurations illustrated in FIGS. 1 to 3.

Referring to FIGS. 1 to 3, an autonomous mobile robot 100 performs a function of cleaning a floor while traveling on a predetermined area by itself. Cleaning the floor disclosed herein includes sucking dust (including foreign materials) on the floor or mopping the floor.

The autonomous mobile robot 100 may include a cleaner main body 110, a cleaning unit 120, a sensing unit 130, and a dust bin 140.

The cleaner main body 110 may include various components in addition to a control unit (not illustrated) for controlling the mobile robot 100. In addition, the cleaner main body 110 may include a wheel unit 111 for traveling the autonomous mobile robot 100. The autonomous mobile robot 100 may be moved or rotated forward, backward, left or right by the wheel unit 111.

Referring to FIG. 3, the wheel unit 111 may include main wheels 111a and a sub wheel 111b.

The main wheels 111a may be provided on both sides of the cleaner main body 110 and may be configured to be rotatable in one direction or another direction according to a control signal of the control unit. Each of the main wheels 111a may be configured to be driven independently of each other. For example, each main wheel 111a may be driven by a different motor. Or, each main wheel 111a may be driven by a plurality of different axes provided in one motor.

The sub wheel 111b may support the cleaner main body 110 together with the main wheels 111a and may assist the traveling of the autonomous mobile robot 100 by the main wheels 111a. The sub wheel 111b may also be provided on a cleaning unit 120 to be described later.

The control unit may control the driving of the wheel unit 111, so that the autonomous mobile robot 100 is allowed to autonomously run the floor.

Meanwhile, the cleaner main body 110 may include a battery (not shown) for supplying power to the autonomous mobile robot 100. The battery 190 may be configured to be rechargeable, and may be detachably disposed in a bottom portion of the cleaner main body 110.

In FIG. 1, a cleaning unit 120 may be disposed in a protruding form from one side of the cleaner main body 110, so as to suck air containing dust or mop an area. The one side may be a side where the cleaner main body 110 travels in a forward direction F, that is, a front side of the cleaner main body 110.

In this drawing, the cleaning unit 120 has a shape protruding from one side of the cleaner main body 110 to front and both left and right sides. Specifically, a front end portion of the cleaning unit 120 may be disposed at a position spaced forward apart from the one side of the cleaner main body 110, and left and right end portions of the cleaning unit 120 may be disposed at positions spaced apart from the one side of the cleaner main body 110 in the right and left directions.

As the cleaner main body 110 is formed in a circular shape and both sides of a rear end portion of the cleaning unit 120 protrude from the cleaner main body 110 to both left and right sides, empty spaces, namely, gaps may be formed between the cleaner main body 110 and the cleaning unit 120. The empty spaces may include spaces between both left and right end portions of the cleaner main body 110 and both left and right end portions of the cleaning unit 120 and each has a shape recessed into the autonomous mobile robot 100.

If an obstacle is caught in the empty space, the autonomous mobile robot 100 may be unmovable due to the obstacle. To prevent this, a cover member 129 may be disposed to cover at least part of the empty space.

The cover member 129 may be provided on the cleaner main body 110 or the cleaning unit 120. In an embodiment of the present disclosure, the cover member 129 may protrude from each of both sides of the rear end portion of the cleaning unit 120 and may cover an outer circumferential surface of the cleaner main body 110.

The cover member 129 may be disposed to fill at least part of the empty space between the cleaner main body 110 and the cleaning unit 120. The cover member 129 may include a structure capable of preventing an obstacle from being caught in the empty space, or escaping an obstacle even if the obstacle is caught in the empty space.

The cover member 129 protruding from the cleaning unit 120 may be supported on the outer circumferential surface of the cleaner main body 110.

The cover member 129 may be supported on a rear portion of the cleaning unit 120 if the cover member 129 protrudes from the cleaner main body 110. According to this structure, when the cleaning unit 120 is impacted due to colliding with an obstacle, a part of the impact may be transferred to the cleaner main body 110 so as to be dispersed.

The cleaning unit 120 may be detachably coupled to the cleaner main body 110. When the cleaning unit 120 is detached from the cleaner main body 110, a mop module (not shown) may be detachably coupled to the cleaner main body 110 in place of the detached cleaning unit 120.

Accordingly, the user may mount the cleaning unit 120 on the cleaner main body 110 when the user wishes to remove dust on the floor, and may mount the mop module on the cleaner main body 110 when the user wants to mop the floor.

When the cleaning unit 120 is mounted on the cleaner main body 110, the mounting may be guided by the cover member 129 described above. As the cover member 129 is disposed to cover the outer circumferential surface of the cleaner main body 110, a relative position of the cleaning unit 120 with respect to the cleaner main body 110 may be determined.

The cleaning unit 120 may comprise a castor 123. The caster 123 may assist the running of the autonomous mobile robot 100 and also support the autonomous mobile robot 100.

The cleaner main body 110 may include a sensing unit 130. As illustrated, the sensing unit 130 may be disposed on one side of the cleaner main body 110 where the cleaning unit 120 is located, for example, on a front side of the cleaner main body 110.

The sensing unit 130 may be disposed to overlap the cleaning unit 120 in an up and down direction of the cleaner main body 110. The sensing unit 130 may be disposed at an upper portion of the cleaning unit 120 so as to detect an obstacle or feature in front of the robot so that the cleaning unit 120 positioned at the forefront of the autonomous mobile robot 100 does not hit the obstacle.

The sensing unit 130 may be configured to perform other additional sensing functions.

By way of example, the sensing unit 130 may include a camera 131 for acquiring surrounding images. The camera 131 may include a lens and an image sensor. The camera 131 may convert a surrounding image of the cleaner main body 110 into an electrical signal that can be processed by the control unit. For example, the camera 131 may transmit an electrical signal corresponding to an upward image to the control unit. The electrical signal corresponding to the upward image may be used by the control unit to detect the position of the cleaner main body 110.

In addition, the sensing unit 130 may detect obstacles such as walls, furniture, and cliffs on a traveling surface or a traveling path of the autonomous mobile robot 100. Also, the sensing unit 130 may sense presence of a docking device that performs battery charging. Also, the sensing unit 130 may detect ceiling information so as to map a traveling area or a cleaning area of the autonomous mobile robot 100.

The cleaner main body 110 may include a dust container 140 detachably coupled thereto for separating and collecting dust from sucked air.

The dust container 140 may include a dust container cover 150 which may cover the dust container 140. In an embodiment, the dust container cover 150 may be coupled to the cleaner main body 110 by a hinge to be rotatable. The dust container cover 150 may be fixed to the dust container 140 or the cleaner main body 110 to keep covering an upper surface of the dust container 140. The dust container 140 may be prevented from being separated from the cleaner main body 110 by the dust container cover 150 when the dust container cover 150 is disposed to cover the upper surface of the dust container 140.

A part of the dust container 140 may be accommodated in a dust container accommodating portion and another part of the dust container 140 may protrude toward the rear of the cleaner main body 110 (i.e., a reverse direction R opposite to a forward direction F).

The dust container 140 is provided with an inlet through which air containing dust may be introduced and an outlet through which air separated from dust may be discharged. The inlet and the outlet may communicate with each other through an opening 155 formed through an inner wall of the cleaner main body 110 when the dust container 140 is mounted on the cleaner main body 110. Thus, an intake passage and an exhaust passage inside the cleaner main body 110 may be formed.

According to such connection, air containing dust introduced through the cleaning unit 120 may flow into the dust container 140 through the intake passage inside the cleaner main body 110 and the air may be separated from the dust while passing through a filter and cyclone of the dust container 140. The separated dust may be collected in the dust container 140, and the air may be discharged from the dust container 140 and may flow along the exhaust passage inside the cleaner main body 110 so as to be externally exhausted through an exhaust port.

Figure 4:
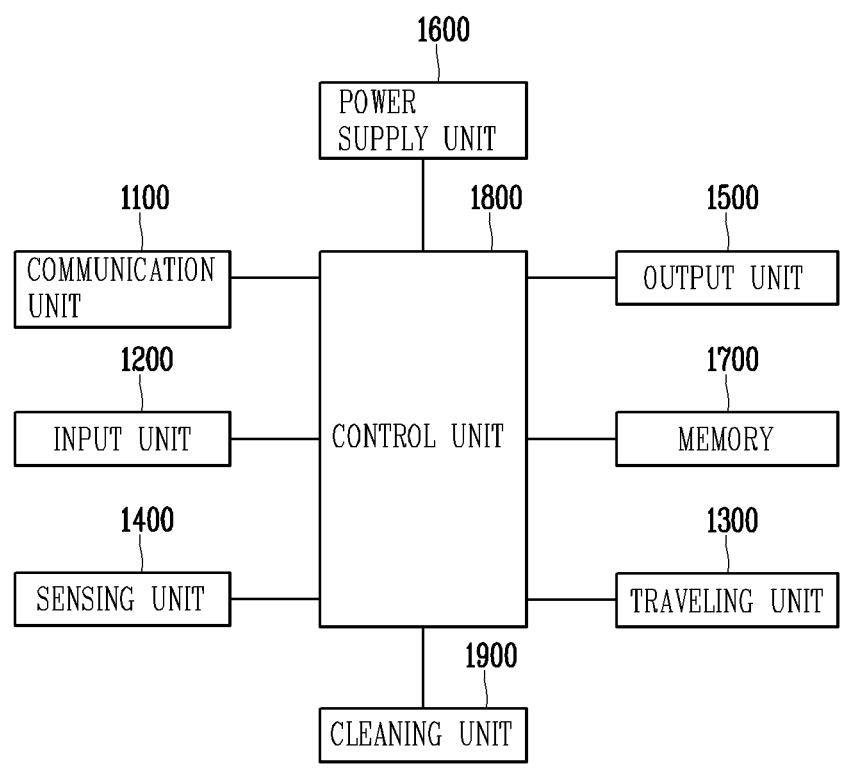
FIG. 4 is a block diagram illustrating exemplary components of an autonomous mobile robot according to an embodiment of the present disclosure.

Hereinafter, an embodiment related to the components of the autonomous mobile robot 100 will be described with reference to FIG. 4.

An autonomous mobile robot 100 or a mobile robot according to an embodiment of the present disclosure may include a communication unit 1100, an input unit 1200, a traveling unit 1300, a sensing unit 1400, an output unit 1500, a power supply unit 1600, a memory 1700, a control unit 1800, and a cleaning unit 1900, or a combination thereof.

An autonomous mobile robot having greater or fewer components may be implemented. Also, as described above, each of a plurality of autonomous mobile robots described in the present disclosure may include only some of components to be described below. Further, a plurality of autonomous mobile robots may include different components.

Hereinafter, each component will be described.

First, the power supply unit 1600 may include a battery that can be charged by an external commercial power supply, and may supply power to the mobile robot. The power supply unit 1600 may supply driving force to each of the components included in the mobile robot to supply operating power required for the mobile robot to travel or perform a specific function.

The control unit 1800 may detect a remaining amount of power (or remaining power level or battery level) of the battery. The control unit 1800 may control the mobile robot to move to a charging base connected to the external commercial power supply when the remaining power is insufficient, so that the battery can be charged by receiving charging current from the charging base. The battery may be connected to a battery sensing portion so that a remaining power level and a charging state can be transmitted to the control unit 1800. The output unit 1500 may display the remaining battery level under the control of the control unit.

The battery may be located in a bottom portion of a center of the autonomous mobile robot, or may be located in either the left or right side. In the latter case, the mobile robot may further include a balance weight to eliminate weight bias of the battery.

The control unit 1800 may perform processing of information based on an artificial intelligence (AI) technology and may include one or more modules that perform at least one of learning of information, inference of information, perception of information, and processing of natural language.

The control unit 1800 may use a machine learning technology to perform at least one of learning, inferring, or processing a large amount of information (big data), such as information stored in the cleaner, environmental information around a mobile terminal, information stored in an external storage capable of performing communication, and the like. The control unit 1800 may control the cleaner to predict (or infer) at least one executable operation and execute an operation having the highest feasibility among the predicted at least one executable operation, by using the information learned using the machine learning technology.

Machine learning technology is a technology that may collect and learn a large amount of information based on at least one algorithm, and judge and predict information based on the learned information. The learning of information is an operation that may grasp characteristics, rules, and judgment criteria of information, quantify relationship between information and information, and predict new data using a quantified pattern.

The at least one algorithm used by the machine learning technology may be a statistical based algorithm, for example, a decision tree that uses a tree structure type as a prediction model, an artificial neural network copying neural network architecture and functions, genetic programming based on biological evolutionary algorithms, clustering to distribute observed examples into subsets of clusters, Monte Carlo method to compute function values through randomly extracted random numbers from probability, or the like.

As a field of machine learning technology, deep learning is a technique that may perform at least one of learning, judging, or processing of information using an Artificial Neural Network (ANN) or a Deep Neuron Network (DNN) algorithm. Such DNN may have an architecture in which layers are connected to transfer data between layers. This deep learning technology may allow learning of a large amount of information through the DNN using a graphic processing unit (GPU) optimized for parallel computing.

The control unit 1800 may use training data stored in an external server or memory, and may include a learning engine mounted to detect characteristics for recognizing a predetermined object. The characteristics for recognizing the object may include a size, shape and shade of the object.

Specifically, when the control unit 1800 inputs a part of images acquired through the camera provided on the cleaner into the learning engine, the learning engine may recognize at least one object or organism included in the input images.

When the learning engine is applied to traveling of the cleaner, the control unit 1800 can recognize whether or not an obstacle such as a chair leg, a fan, and a specific shape of balcony gap, which obstruct the running of the cleaner, exists around the cleaner. This may result in enhancing efficiency and reliability of the traveling of the cleaner.

On the other hand, the learning engine may be mounted on the control unit 1800 or on an external server. When the learning engine is mounted on an external server, the control unit 1800 may control the communication unit 1100 to transmit at least one image to be analyzed, to the external server.

The external server may input the image transmitted from the cleaner into the learning engine and thus recognize at least one object or organism included in the image. In addition, the external server may transmit information related to the recognition result back to the cleaner. In this case, the information related to the recognition result may include information related to the number of objects included in the image to be analyzed and a name of each object.

On the other hand, the traveling unit 1300 may include a motor, and operate the motor to bidirectionally rotate left and right main wheels, so that the main body can rotate or move. The left and right main wheels may be independently moved. The traveling unit 1300 may advance the main body of the mobile robot forward, backward, left, right, curvedly, or in place.

On the other hand, the input unit 1200 may receive various control commands for the autonomous mobile robot from the user. The input unit 1200 may include one or more buttons, for example, the input unit 1200 may include an OK button, a setting button, and the like. The OK button may be a button for receiving a command for confirming detection information, obstacle information, position information, and map information from the user, and the setting button may be a button for receiving a command for setting those information from the user.

In addition, the input unit 1200 may include an input reset button for canceling a previous user input and receiving a new user input, a delete button for deleting a preset user input, a button for setting or changing an operation mode, a button for receiving an input to return to the charging base.

In addition, the input unit 1200 may be implemented as a hard key, a soft key, a touch pad, or the like and may be disposed on a top of the mobile robot. For example, the input unit 1200 may implement a form of a touch screen together with the output unit 1500.

On the other hand, the output unit 1500 may be installed on a top of the mobile robot. Of course, an installation location and an installation type may vary. For example, the output unit 1500 may display a battery level state, a traveling mode or manner, or the like on a screen.

The output unit 1500 may output internal status information of the mobile robot detected by the sensing unit 1400, for example, a current status of each component included in the mobile robot. The output unit 1500 may also display external status information detected by the sensing unit 1400, obstacle information, position information, map information, and the like on the screen. The output unit 1500 may be configured as one device of a light emitting diode (LED), a liquid crystal display (LCD), a plasma display panel, and an organic light emitting diode (OLED).

The output unit 1500 may further include an audio output module for audibly outputting information related to an operation of the mobile robot executed by the control unit 1800 or an operation result. For example, the output unit 1500 may output warning sound to the outside in response to a warning signal generated by the control unit 1800.

In this case, the audio output module (not shown) may be means, such as a beeper, a speaker or the like for outputting sounds, and the output unit 1500 may output sounds to the outside through the audio output module using audio data or message data having a predetermined pattern stored in the memory 1700.

Accordingly, the mobile robot according to an embodiment of the present disclosure can output environmental information related to a traveling area through the output unit 1500 or output the same in an audible manner. According to another embodiment, the mobile robot may transmit map information or environmental information to a terminal device through the communication unit 1100 so that the terminal device outputs a screen to be output through the output unit 1500 or sounds.

The memory 1700 stores a control program for controlling or driving the autonomous mobile robot and data corresponding thereto. The memory 1700 may store audio information, image information, obstacle information, position information, map information, and the like. Also, the memory 1700 may store information related to a traveling pattern.

The memory 1700 may mainly use a nonvolatile memory. The non-volatile memory (NVM, NVRAM) may be a storage device that can continuously store information even when power is not supplied. Examples of the storage device may include a ROM, a flash memory, a magnetic computer storage device (e.g., a hard disk, a diskette drive, a magnetic tape), an optical disk drive, a magnetic RAM, a PRAM, and the like.

On the other hand, the sensing unit 1400 may include at least one of an external signal sensor, a front sensor, a cliff sensor, a two-dimensional (2D) camera sensor, and a three-dimensional (3D) camera sensor.

The external signal sensor or external signal detection sensor may sense an external signal of a mobile robot. The external signal sensor may be, for example, an infrared ray (IR) sensor, an ultrasonic sensor, a radio frequency (RF) sensor, or the like.

The mobile robot may detect a position and direction of the charging base by receiving a guidance signal generated by the charging base using the external signal sensor. The charging base may transmit a guidance signal indicating a direction and distance so that the mobile robot can return thereto. The mobile robot may determine a current position and set a moving direction by receiving a signal transmitted from the charging base, thereby returning to the charging base.

On the other hand, the front sensors or front detection sensors may be installed at a predetermined distance on the front of the mobile robot, specifically, along a circumferential surface of a side surface of the mobile robot. The front sensor may be located on at least one side surface of the mobile robot to detect an obstacle in front of the mobile robot. The front sensor may detect an object, especially an obstacle, located in a moving path of the mobile robot and transmit detection information to the control unit 1800. For example, the front sensor may detect protrusions in the moving path of the mobile robot, household appliances, furniture, walls, wall corners, and the like, and may transmit the information to the control unit 1800.

For example, the frontal sensor may be an infrared ray (IR) sensor, an ultrasonic sensor, an RF sensor, a geomagnetic sensor, or the like, and the mobile robot may use one type of sensor as the front sensor or two or more types of sensors if necessary.

An ultrasonic sensor, for example, may generally be used to detect a remote obstacle. The ultrasonic sensor may include a transmitter and a receiver. The control unit 1800 may determine presence or non-presence of an obstacle according to whether ultrasonic waves radiated from the transmitter are reflected by an obstacle or the like and then received by the receiver, and calculate a distance from the obstacle using an ultrasonic wave radiation time and an ultrasonic wave reception time.

Also, the control unit 1800 may detect information related to a size of an obstacle by comparing ultrasonic waves radiated from the transmitter with ultrasonic waves received by the receiver. For example, the control unit 1800 may determine that the obstacle is larger in size when more ultrasonic waves are received in the receiver.

In one embodiment, a plurality (e.g., five) of ultrasonic sensors may be installed on side surfaces of the mobile robot at the front side along an outer circumferential surface. The ultrasonic sensors may preferably be installed on the front surface of the mobile robot in a manner that the transmitter and the receiver are alternately arranged.

The transmitters may be disposed at right and left sides while being spaced apart from a front center of the main body or one transmitter or at least two transmitters may be disposed between the receivers so as to form a reception area of an ultrasonic signal reflected from an obstacle or the like. With this arrangement, the reception area may increase while reducing the number of sensors. A radiation angle of ultrasonic waves may be maintained in a range to avoid affecting different signals and prevent a crosstalk. Also, receiving sensitivity of the receivers may be set differently.

In addition, the ultrasonic sensor may be installed upward by a predetermined angle so that the ultrasonic waves emitted from the ultrasonic sensor are output upward. In this instance, the ultrasonic sensor may further include a predetermined blocking member to prevent the ultrasonic waves from being radiated downward.

On the other hand, as described above, the front sensor may be implemented by using two or more types of sensors together, and thus the front sensor may use any one of an IR sensor, an ultrasonic sensor, an RF sensor and the like.

For example, the front sensor may include an IR sensor as another sensor, in addition to the ultrasonic sensor.

The IR sensor may be installed on an outer circumferential surface of the mobile robot together with the ultrasonic sensor. The IR sensor may also detect an obstacle existing on a front or side of the mobile robot and transmit obstacle information to the control unit 1800. For example, the IR sensor may detect a protrusion, a household fixture, furniture, a wall, a wall edge, and the like, present in the moving path of the mobile robot, and may transmit detection information to the control unit 1800. Therefore, the mobile robot can move within a specific area without collision with an obstacle.

On the other hand, a cliff sensor (or cliff detection sensor) may detect an obstacle on the floor supporting the main body of the mobile robot by mainly using various types of optical sensors.

The cliff sensor may also be installed on a rear surface of the mobile robot on the floor, but may be installed on a different position depending on a type of the mobile robot. The cliff sensor may be located on the rear surface of the mobile robot and may detect an obstacle on the floor. The cliff sensor may be an IR sensor, an ultrasonic sensor, an RF sensor, a Position Sensitive Detector (PSD) sensor, and the like, which may include a transmitter and a receiver, similar to the obstacle detection sensor.

For example, one of the cliff sensors may be installed on the front of the mobile robot, and two other cliff sensors may be installed relatively behind.

For example, the cliff sensor may be a PSD sensor, but may alternatively be configured by a plurality of different kinds of sensors.

The PSD sensor may detect a short/long distance location of incident light at one p-n junction using semiconductor surface resistance. The PSD sensor may include a one-dimensional PSD sensor that detects light only in one axial direction, and a two-dimensional PSD sensor that detects a light position on a plane. Both of the PSD sensors may have a pin photodiode structure. As a type of infrared sensor, the PSD sensor may use infrared rays. The PSD sensor may emit infrared ray, and may measure a distance by calculating an angle of the infrared ray reflected and returned from an obstacle. The PSD sensor may calculate a distance from the obstacle by using the triangulation method.

The PSD sensor may include a light emitter that emits infrared rays to an obstacle and a light receiver that receives infrared rays that are reflected and returned from the obstacle, and may be configured as a module type. When an obstacle is detected by using the PSD sensor, a stable measurement value may be obtained irrespective of reflectivity and color difference of the obstacle.

The control unit 1800 may measure an infrared ray angle between a light signal of infrared ray emitted by the cliff detection sensor toward the ground and a reflection signal reflected and received from an obstacle, so as to detect a cliff and analyze a depth of the cliff.

Meanwhile, the control unit 1800 may determine whether to pass a cliff or not according to a ground state of the detected cliff by using the cliff detection sensor, and decide whether to pass the cliff or not according to the determination result. For example, the control unit 1800 may determine presence or non-presence of a cliff and a depth of the cliff through the cliff sensor, and then allow the mobile robot to pass through the cliff only when a reflection signal is detected through the cliff sensor.

As another example, the control unit 1800 may also determine lifting of the mobile robot using the cliff sensor.

On the other hand, the two-dimensional camera sensor may be provided on one surface of the mobile robot to acquire image information related to the surroundings of the main body during movement.

An optical flow sensor may convert a lower image input from an image sensor provided in the sensor to generate image data of a predetermined format. The generated image data may be stored in the memory 1700.

Also, at least one light source may be installed adjacent to the optical flow sensor. The at least one light source may emit light to a predetermined area of the floor, which may be captured by the image sensor. When the mobile robot moves in a specific area along the floor surface, a certain distance may be maintained between the image sensor and the floor surface when the floor surface is flat. On the other hand, when the mobile robot moves on a floor surface which is not flat, the image sensor and the floor surface may be spaced apart from each other by a predetermined distance due to an unevenness and an obstacle on the floor surface. The at least one light source may be controlled by the control unit 1800 to adjust an amount of light to be emitted. The light source may be a light emitting device, for example, a light emitting diode (LED), which is capable of adjusting an amount of light.

The control unit 1800 may detect a position of the mobile robot irrespective of slippage of the mobile robot, using the optical flow sensor. The control unit 1800 may compare and analyze image data captured by the optical flow sensor according to time to calculate a moving distance and a moving direction, and calculate a position of the mobile robot based on the calculated moving distance and moving direction. By using the image information regarding the lower side of the mobile robot captured by the image sensor, the control unit 1800 may perform correction that is robust against slippage with respect to the position of the mobile robot calculated by another member.

The three-dimensional (3D) camera sensor may be attached to one surface or a part of the main body of the mobile robot to generate 3D coordinate information related to surroundings of the main body.

The 3D camera sensor may be a 3D depth camera that calculates a remote/near distance between the mobile robot and an object to be captured.

The 3D camera sensor may capture 2D images related to surroundings of the main body, and generate a plurality of 3D coordinate information corresponding to the captured 2D images.

In one embodiment, the 3D camera sensor may be configured in a stereoscopic vision type which may include two or more cameras for acquiring 2D images, and merge at least two images acquired by the two or more cameras to generate a 3D coordinate information.

The 3D camera sensor according to the embodiment may include a first pattern irradiating portion for downwardly irradiating light of a first pattern toward the front of the main body, a second pattern irradiating portion for upwardly irradiating light of a second pattern toward the front of the main body, and an image acquiring portion for acquiring a front image of the main body. Thus, the image acquiring portion may acquire an image of an area where the light of the first pattern and the light of the second pattern are incident.

In another embodiment, the 3D camera sensor may include an infrared pattern irradiating portion for irradiating an infrared pattern, in addition to a single camera, and capture a shape that the infrared pattern irradiated from the infrared pattern irradiating portion is projected onto an object to be captured, thereby measuring a distance between the 3D camera sensor and the object to be captured. The 3D camera sensor may be an IR type 3D camera sensor.

In another embodiment, the 3D camera sensor may include a light emitting portion for emitting light, in addition to a single camera. The 3D camera sensor may receive a part of laser light (or laser beam), which is emitted from the light emitting portion and reflected from an object to be captured, and analyze the received light, thereby measuring a distance between the 3D camera sensor and the object to be captured. The 3D camera sensor may be a time-of-flight (TOF) type 3D camera sensor.

The laser of the 3D camera sensor may be configured to irradiate a laser beam extending in at least one direction. In one example, the 3D camera sensor may be provided with first and second lasers. The first laser may irradiate linear laser beams intersecting each other, and the second laser may irradiate single linear laser beam. According to this, the lowermost laser may be used to detect an obstacle on a bottom, the uppermost laser may be used to detect an obstacle on a top, and an intermediate laser between the lowermost laser and the uppermost laser may be used to detect an obstacle at a middle portion.

On the other hand, the communication unit 1100 may be connected to a terminal device and/or another device (also referred to as "home appliance" herein) through one of wired, wireless and satellite communication methods, so as to transmit and receive signals and data.

The communication unit 1100 may transmit and receive data with another device located in a specific area. In this case, the another device may be any device if it can transmit and receive data through a network. For example, the another device may be an air conditioner, a heating device, an air purifier, a lamp, a TV, a vehicle, and the like. The another device may also be a device for controlling a door, a window, a water supply valve, a gas valve, or the like. The another device may also be a sensor for detecting temperature, humidity, air pressure, gas, or the like.

Further, the communication unit 1100 may communicate with another autonomous mobile robot 100 located in a specific area or within a predetermined range.

Figure 5A:
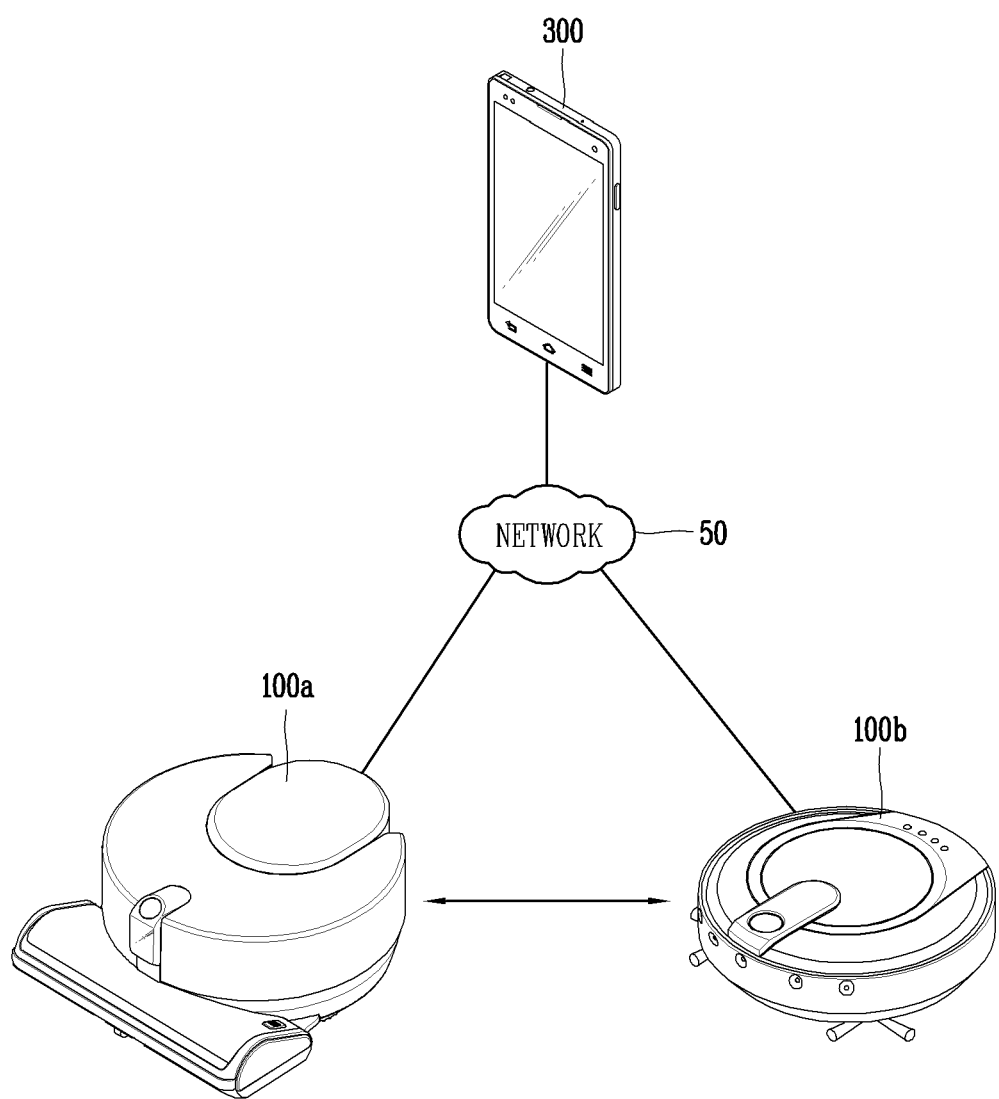
FIG. 5A is a conceptual view illustrating a network communication between a plurality of autonomous mobile robots according to an embodiment of the present disclosure.
Figure 5B:
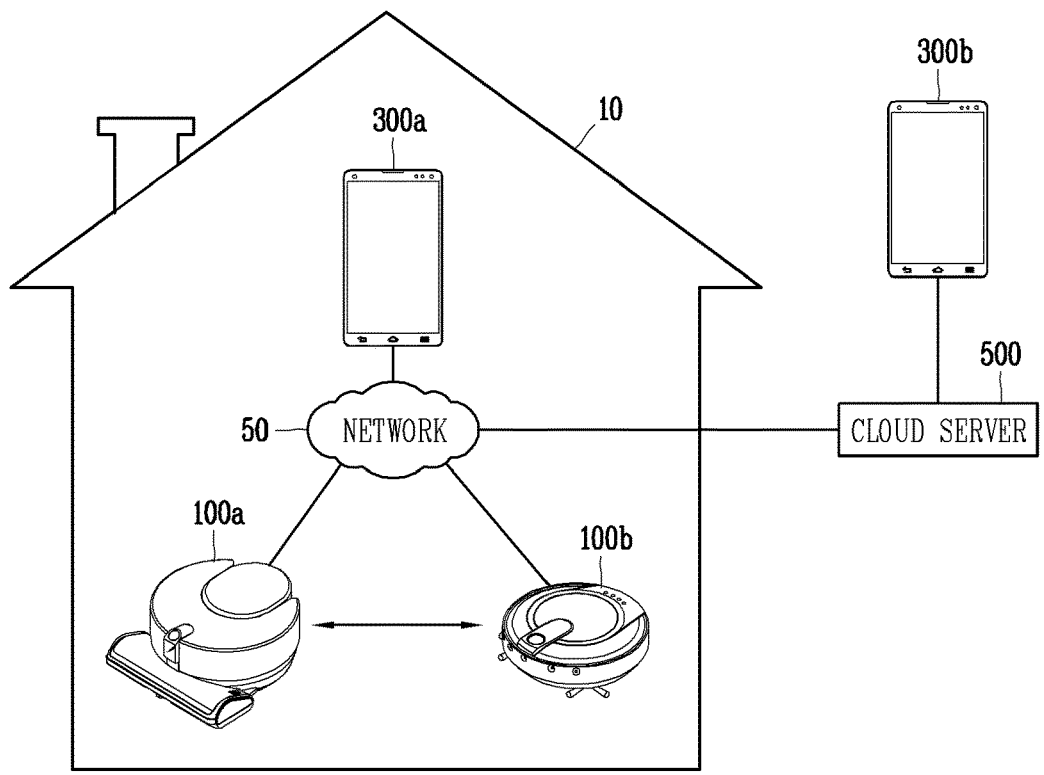
FIG. 5B is a conceptual view illustrating an example of the network communication of FIG. 5A according to an embodiment of the present disclosure.

Referring to FIGS. 5A and 5B, a first autonomous mobile robot 100*a* and a second autonomous mobile robot 100*b* may exchange data with each other through a network communication 50. In addition, the first autonomous mobile robot 100*a* and/or the second autonomous mobile robot 100*b* may perform a cleaning related operation or a corresponding operation by a control command received from a terminal 300 through the network communication 50 or other communication.

Although not shown, the plurality of autonomous mobile robots 100*a* and 100*b* may perform communication with the terminal 300 through a first network communication and perform communication with each other through a second network communication.

The network communication 50 may refer to short-range communication using at least one of wireless communication technologies, such as a wireless LAN (WLAN), a wireless personal area network (WPAN), a wireless fidelity (Wi-Fi) Wi-Fi direct, Digital Living Network Alliance (DLNA), Wireless Broadband (WiBro), World Interoperability for Microwave Access (WiMAX), Zigbee, Z-wave, Blue-Tooth, Radio Frequency Identification (RFID), Infrared Data Association (IrDA), Ultrawide-Band (UWB), Wireless Universal Serial Bus (USB), and the like.

The network communication 50 may vary depending on a communication mode of the autonomous mobile robots desired to communicate with each other.

In FIG. 5A, the first autonomous mobile robot 100*a* and/or the second autonomous mobile robot 100*b* may provide information sensed by the respective sensing units thereof to the terminal 300 through the network communication 50. The terminal 300 may also transmit a control command generated based on the received information to the first autonomous mobile robot 100*a* and/or the second autonomous mobile robot 100*b* via the network communication 50.

In FIG. 5A, the communication unit of the first autonomous mobile robot 100*a* and the communication unit of the second autonomous mobile robot 100*b* may also directly communicate with each other or indirectly communicate with each other via another router (not shown), to recognize information related to a traveling state and positions of counterparts.

In one example, the second autonomous mobile robot 100*b* may perform a traveling operation and a cleaning operation according to a control command received from the first autonomous mobile robot 100*a*. In this case, the first autonomous mobile robot 100*a* may operate as a master cleaner and the second autonomous mobile robot 100*b* may operate as a slave cleaner. Alternatively, the second autonomous mobile robot 100*b* may follow the first autonomous mobile robot 100*a*. In some cases, the first autonomous mobile robot 100*a* and the second autonomous mobile robot 100*b* may collaborate with each other.

Hereinafter, a system including a plurality of cleaners 100*a* and 100*b* performing autonomous traveling according to an embodiment of the present disclosure will be described with reference to FIG. 5B.

As illustrated in FIG. 5B, a cleaning system according to an embodiment of the present disclosure may include a plurality of cleaners 100*a* and 100*b* performing autonomous traveling, a network 50, a server 500, and a plurality of terminals 300*a* and 300*b*.

The plurality of cleaners 100*a* and 100*b*, the network 50 and at least one terminal 300*a* may be disposed in a building 10 while another terminal 300*b* and the server 500 may be located outside the building 10.

The plurality of cleaners 100*a* and 100*b* may be cleaners that perform cleaning while traveling by themselves, and may perform autonomous traveling and autonomous cleaning. Each of the plurality of cleaners 100a and 100b may include a communication unit 1100, in addition to the traveling function and the cleaning function.

The plurality of cleaners 100a and 100b, the server 500 and the plurality of terminals 300a and 300b may be connected together through the network 50 to exchange data. To this end, although not shown, a wireless router such as an access point (AP) device and the like may further be provided. In this case, the terminal 300a located in the building (internal network) 10 may access at least one of the plurality of cleaners 100a and 100b through the AP device so as to perform monitoring, remote control and the like with respect to the cleaner. Also, the terminal 300b located in an external network may access at least one of the plurality of cleaners 100a and 100b through the AP device, to perform monitoring, remote control and the like with respect to the cleaner.

The server 500 may be wirelessly connected through the terminal 300b. Alternatively, the server 500 may be connected to at least one of the plurality of cleaners 100a and 100b without passing through the mobile terminal 300b.

The server 500 may include a programmable processor and may include various algorithms. By way of example, the server 500 may include algorithms for performing machine learning and/or data mining. As an example, the server 500 may include a speech recognition algorithm. In this case, when receiving voice data, the received voice data may be output by being converted into data in a text format.

The server 500 may store firmware information, operation information (course information and the like) related to the plurality of cleaners 100a and 100b, and may register product information regarding the plurality of cleaners 100a and 100b. For example, the server 500 may be a server operated by a cleaner manufacturer or a server operated by an open application store operator.

In another example, the server 500 may be a home server that is provided in the internal network 10 and stores status information regarding the home appliances or stores contents shared by the home appliances. If the server 500 is a home server, information related to foreign substances, for example, foreign substance images and the like may be stored.

Meanwhile, the plurality of cleaners 100a and 100b may be directly connected to each other wirelessly via Zigbee, Z-wave, Blue-Tooth, Ultra-wide band, and the like. In this case, the plurality of cleaners 100a and 100b may exchange position information and traveling information with each other.

Any one of the plurality of cleaners 100a and 100b may be a master cleaner 100a and another may be a slave cleaner 100b.

In this case, the first mobile robot 100a may control traveling and cleaning of the second mobile robot 100b. In addition, the second mobile robot 100b may perform traveling and cleaning while following the first mobile robot 100a. In some cases, the second mobile robot 100b may perform traveling and cleaning while following the first mobile robot 100a and maintaining a proper distance from the first mobile robot 100a.

Figure 5C:
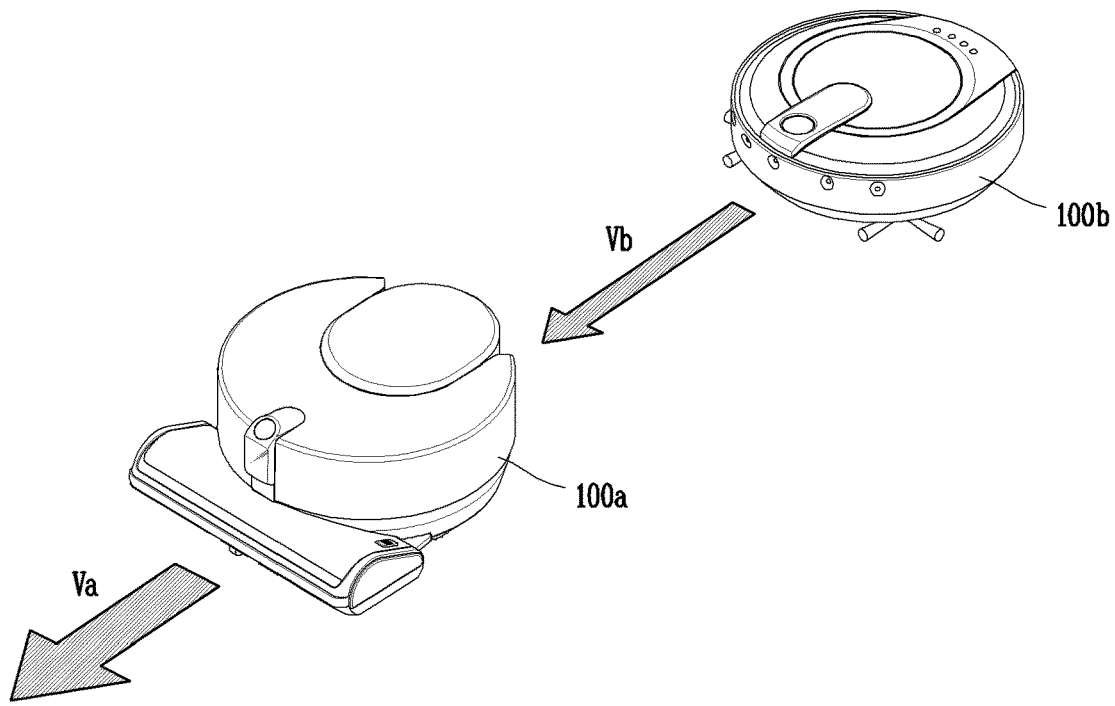
FIG. 5C is a conceptual view illustrating a following travel of a plurality of autonomous mobile robots according to an embodiment of the present disclosure.

Referring to FIG. 5C, the first mobile robot 100a may control the second mobile robot 100b such that the second mobile robot 100b may follow the first mobile robot 100a.

To this end, the first mobile robot 100a and the second mobile robot 100b may be present in a specific area where they can communicate with each other, and the second mobile robot 100b may recognize at least a relative position of the first mobile robot 100a.

For example, the communication unit of the first mobile robot 100a and the communication unit of the second mobile robot 100b may exchange IR signals, ultrasonic signals, carrier frequencies, impulse signals, and the like, and may analyze them through triangulation, so as to calculate movement displacements of the first mobile robot 100a and the second mobile robot 100b, thereby recognizing relative positions of the first mobile robot 100a and the second mobile robot 100b. However, the present disclosure is not limited to this method, and one of the various wireless communication technologies described above may be used to recognize the relative positions of the first mobile robot 100a and the second mobile robot 100b through triangulation or the like.

When the first mobile robot 100a recognizes the relative position with the second mobile robot 100b, the second mobile robot 100b may be controlled based on map information stored in the first mobile robot 100a or map information stored in the server, the terminal or the like. In addition, the second mobile robot 100b may share obstacle information sensed by the first mobile robot 100a. The second mobile robot 100b may perform an operation based on a control command (for example, a control command related to a traveling direction, a traveling speed, a stop, etc.) received from the first mobile robot 100a.

Specifically, the second mobile robot 100b may perform cleaning while traveling along a traveling path of the first mobile robot 100a. However, the traveling directions of the first mobile robot 100a and the second mobile robot 100b may not always coincide with each other. For example, when the first mobile robot 100a moves or rotates up/down/right/left, the second mobile robot 100b may move or rotate up/down/right/left after a predetermined time, and thus current advancing directions of the first and second mobile robot 100a and 100b may differ from each other.

Also, a traveling speed Va of the first mobile robot 100a and a traveling speed Vb of the second mobile robot 100b may be different from each other.

The first mobile robot 100a may control the traveling speed Vb of the second mobile robot 100b to be varied in consideration of a distance at which the first mobile robot 100a and the second mobile robot 100b can communicate with each other. For example, if the first mobile robot 100a and the second mobile robot 100b move away from each other by a predetermined distance or more, the first mobile robot 100a may control the traveling speed Vb of the second mobile robot 100b to be faster than before. On the other hand, when the first mobile robot 100a and the second mobile robot 100b move close to each other by a predetermined distance or less, the first mobile robot 100a may control the traveling speed Vb of the second mobile robot 100b to be slower than before or control the second mobile robot 100b to stop for a predetermined time. Accordingly, the second mobile robot 100b may perform cleaning while continuously following the first mobile robot 100a.

According to the present disclosure, the first mobile robot 100a may include reception sensors on front and rear sides, so that the control unit of the first mobile robot 100a may recognize a receiving direction of an optical signal received from the second mobile robot 100b by distinguishing the front and rear sides. To this end, a UWB module may be provided at the rear of the first mobile robot 100a and another UWB module or a plurality of optical sensors may be disposed at the front of the first mobile robot 100a in a spacing manner. The first mobile robot 100a may recognize a receiving direction of an optical signal received from the second mobile robot 100b and determine whether the second mobile robot 100b is coming from behind it or is located at the front of it.

Figure 6A:
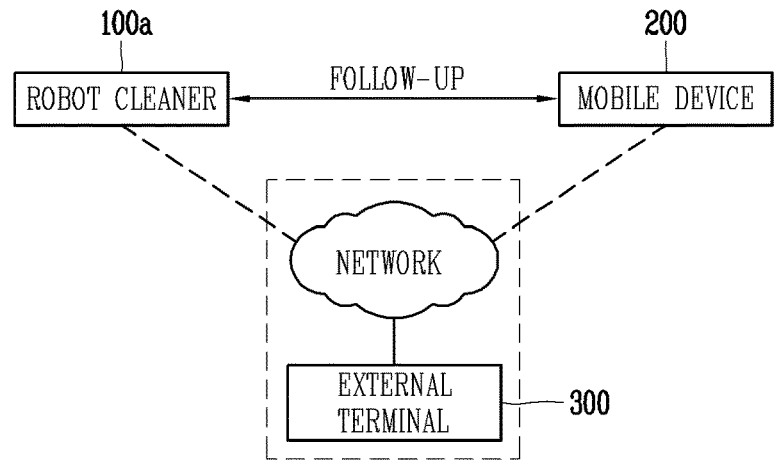
FIG. 6A is a conceptual view illustrating a follow-up registration and a follow-up control between a first mobile robot and a mobile device, according to an embodiment of the present disclosure.
Figure 6B:
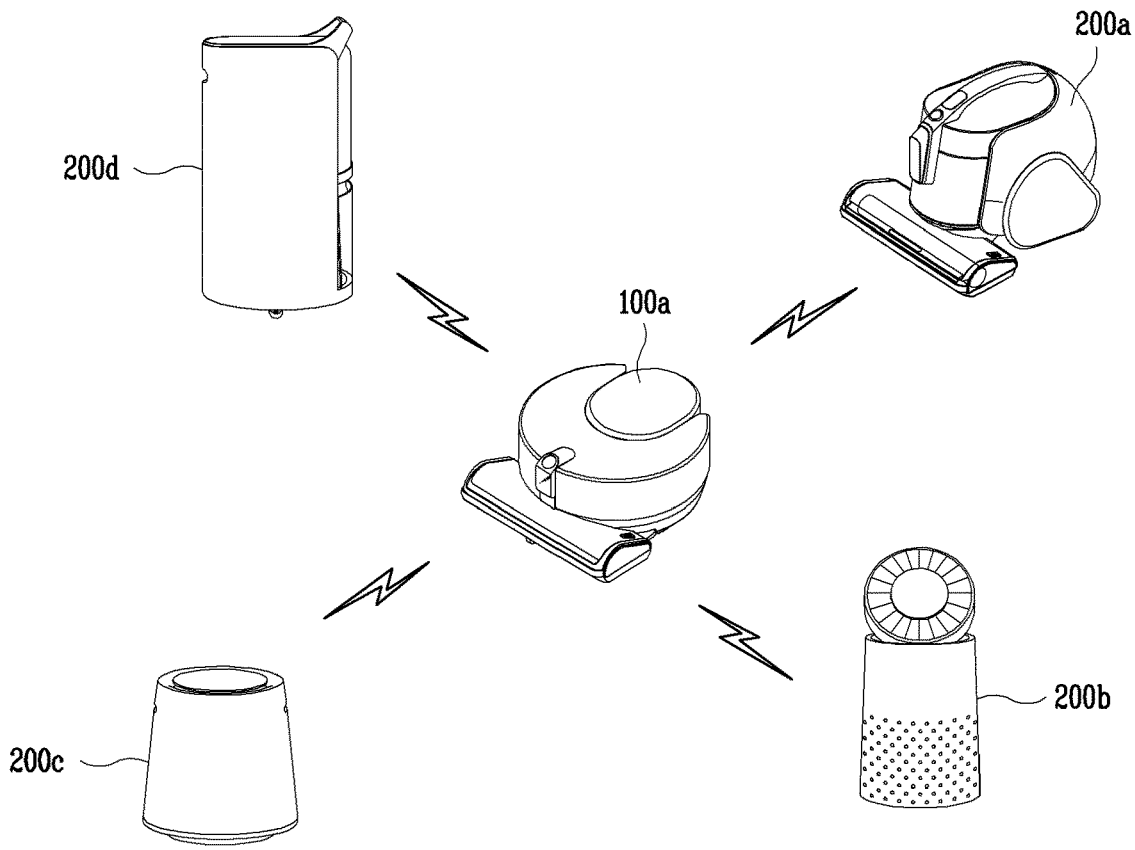
FIG. 6B is another conceptual view illustrating the follow-up registration and the follow-up control between the first mobile robot and the mobile device of FIG. 6A, according to an embodiment of the present disclosure.
Figure 6C:
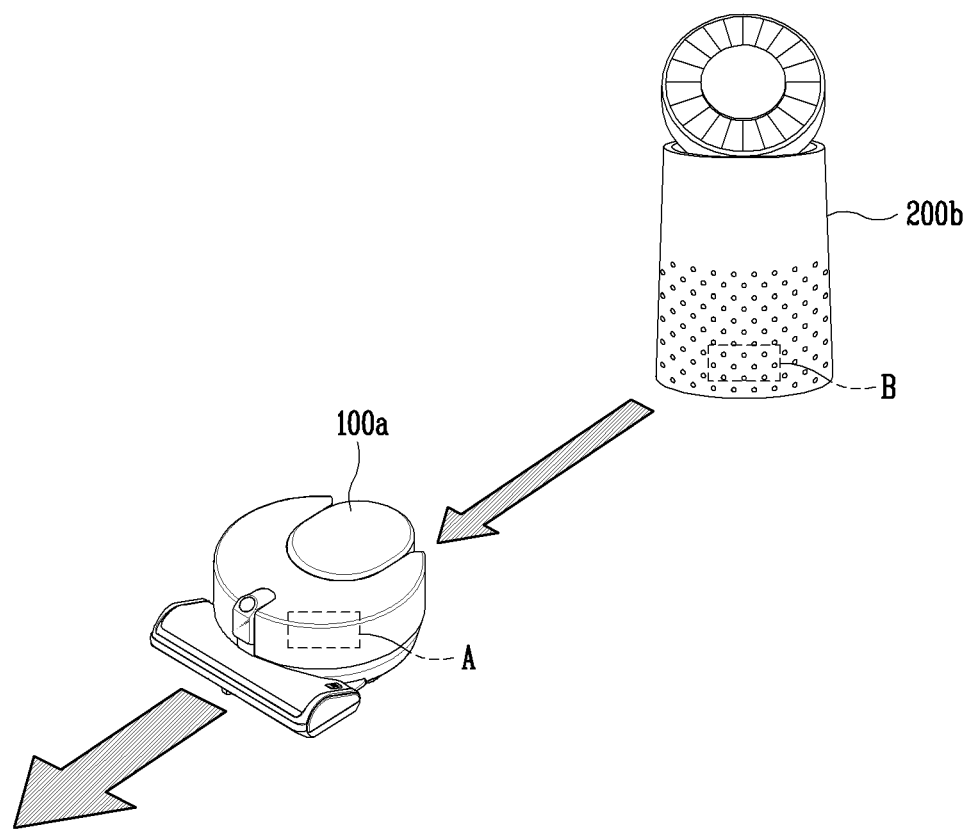
FIG. 6C is another conceptual view illustrating the follow-up registration and the follow-up control between the first mobile robot and the mobile device of FIG. 6A, according to an embodiment of the present disclosure.

FIGS. 6A, 6B, and 6C are alternative embodiments of follow-up control between the first mobile robot and the second mobile robot in accordance with the present disclosure. Hereinafter, a follow-up control between the first mobile robot and a mobile device will be described in detail. The follow-up control disclosed herein means that the mobile device follows the first mobile robot, or a movement path of the first mobile robot.

Referring to FIG. 6A, the first mobile robot 100a may control the follow-up of a mobile device 200 by communicating with the mobile device 200 instead of the second mobile robot.

In some embodiments, the mobile device 200 may be any electronic device provided with a driving function without a clean function. For example, the mobile device 200 may include various types of home appliances or other electronic devices, such as a dehumidifier, a humidifier, an air purifier, an air conditioner, a smart TV, an artificial intelligent speaker, a digital photographing device, and the like.

In other embodiments, the mobile device 200 may be any device equipped with a traveling function without a navigation function for detecting an obstacle by itself or traveling up to a predetermined destination.

The first mobile robot 100a may be a mobile robot having both the navigation function and the obstacle detection function and can control the follow-up of the mobile device 200. The first mobile robot 100a may be a dry-type cleaner or a wet-type cleaner.

The first mobile robot 100a and the mobile device 200 may communicate with each other through a network (not shown), but may directly communicate with each other.

The communication using the network may be communication using, for example, WLAN, WPAN, Wi-Fi, Wi-Fi Direct, Digital Living Network Alliance (DLNA), Wireless Broadband (WiBro), World Interoperability for Microwave Access (WiMAX), etc. The mutual direct communication may be performed using, for example, UWB, Zigbee, Z-wave, Blue-Tooth, RFID, and Infrared Data Association (IrDA), and the like.

If the first mobile robot 100a and the mobile device 200 are close to each other, the mobile device 200 may be set to follow the first mobile robot 100a through a manipulation in the first mobile robot 100a.

If the first mobile robot 100a and the mobile device 200 are far away from each other, although not shown, the mobile device 200 may be set to follow the first mobile robot 100a through a manipulation in an external terminal 300 (see FIG. 5A).

Specifically, follow-up relationship between the first mobile robot 100a and the mobile device 200 may be established through network communication with the external terminal 300 (see FIG. 5A). The external terminal 300 may be an electronic device capable of performing wired or wireless communication, and may be a tablet, a smart phone, a notebook computer, or the like. At least one application related to follow-up control by the first mobile robot 100a (hereinafter, 'follow-up related application') may be installed in the external terminal 300. The user may execute the follow-up related application installed in the external terminal 300 to select and register the mobile device 200 subjected to the follow-up control by the first mobile robot 100a. When the mobile device 200 subjected to the follow-up control is registered, the external terminal may recognize product information of the mobile device, and such product information may be provided to the first mobile robot 100a via the network.

The external terminal 300 may recognize the position of the first mobile robot 100a and the position of the registered mobile device 200 through communication with the first mobile robot 100a and the registered mobile device 200. Afterwards, the first mobile robot 100a may travel toward the position of the registered mobile device 200 or the registered mobile device 200 may travel toward the position of the first mobile robot 100a according to a control signal transmitted from the external terminal 300. When it is detected that the relative positions of the first mobile robot 100a and the registered mobile device 200 are within a predetermined following distance, the follow-up control for the mobile device 200 by the first mobile robot 100a may be started. The follow-up control may then be performed by direct communication between the first mobile robot 100a and the mobile device 200 without the intervention of the external terminal 300.

The setting of the follow-up control may be released by the operation of the external terminal 300 or automatically terminated as the first mobile robot 100a and the mobile device 200 move away from the predetermined following distance.

The user may change, add, or remove the mobile device 200 to be controlled by the first mobile robot 100a by manipulating the first mobile robot 100a or the external terminal 300. For example, referring to FIG. 6B, the first mobile robot 100a may perform the follow-up control for at least one mobile device 200 of another cleaner 200a or 100b, an air purifier 200b, a humidifier 200c, and a dehumidifier 200d.

Generally, since the mobile device 200 may be different from the first mobile robot 100a in its function, product size, and traveling ability, it may be difficult for the mobile device 200 to follow the movement path of the mobile robot 100a as it is. For example, there may be an exceptional situation in which it may be difficult for the mobile device 200 to follow the movement path of the first mobile robot 100a according to a geographical characteristic of a space, a size of an obstacle, and the like. In consideration of such an exceptional situation, the mobile device 200 may travel or wait by omitting a part of the movement path even if it recognizes the movement path of the first mobile robot 100a. To this end, the first mobile robot 100a may detect whether or not the exceptional situation occurs, and control the mobile device 200 to store data corresponding to the movement path of the first mobile robot 100a in a memory or the like. Then, depending on situations, the first mobile robot 100a may control the mobile device 200 to travel with deleting part of the stored data or to wait in a stopped state.

FIG. 6C illustrates an example of a follow-up control between the first mobile robot 100a and the mobile device 200, for example, the air cleaner 200b having a traveling function. The first mobile robot 100a and the air purifier 200b may include communication modules A and B for determining relative positions thereof, respectively. The communication modules A and B may be one of the modules for emitting and receiving an IR signal, an ultrasonic signal, a carrier frequency, or an impulse signal. The recognition of the relative positions through the communication modules A and B has been described above in detail, so a description thereof will be omitted. The air purifier 200b may receive traveling information corresponding to a traveling command (e.g., changes in traveling including a traveling direction and a traveling speed, traveling stop, etc.) from the first mobile robot 100a, travel according to the received traveling information, and perform air purification. Accordingly, the air purification may be performed in real time with respect to a cleaning space in which the first mobile robot 100a operates. In addition, since the first mobile robot 100a has already recognized the production information related to the mobile device 200, the first mobile robot 100a may control the air purifier 200b to record the traveling information of the first mobile robot 100a, and travel with deleting part of the traveling information or wait in a stopped state.

Hereinafter, description will be given in more detail of a method in which a plurality of mobile robots determines relative positions to perform a following travel in accordance with one embodiment of the present disclosure, with reference to the accompanying drawings.

The first autonomous mobile robot 100a of the present disclosure may be referred to as a first mobile robot or a first mobile robot 100a and the second autonomous mobile robot 100b may be referred to as a second mobile robot or a second mobile robot 100b.

Also, in the present disclosure, the first mobile robot 100a may serve as a leading cleaner (or master cleaner) that travels in a direction ahead of the second mobile robot 100b, and the second mobile robot 100b may serve as a following cleaner (or slave cleaner) that follows the first mobile robot 100a.

The first and second mobile robots 100a and 100b may perform traveling and cleaning in a following manner without a user's intervention.

In order for the second mobile robot 100b to follow the first mobile robot 100a, the second mobile robot 100b may determine or recognize the relative position of the first mobile robot 100a.

The present disclosure provides a method of estimating a highly accurate relative position using a minimum number of components, which may result in cost savings.

Hereinafter, a method of determining the relative position of the first mobile robot 100a by the second mobile robot 100b by using only the least components will be described in more detail, with reference to the accompanying drawings.

Figure 7B:
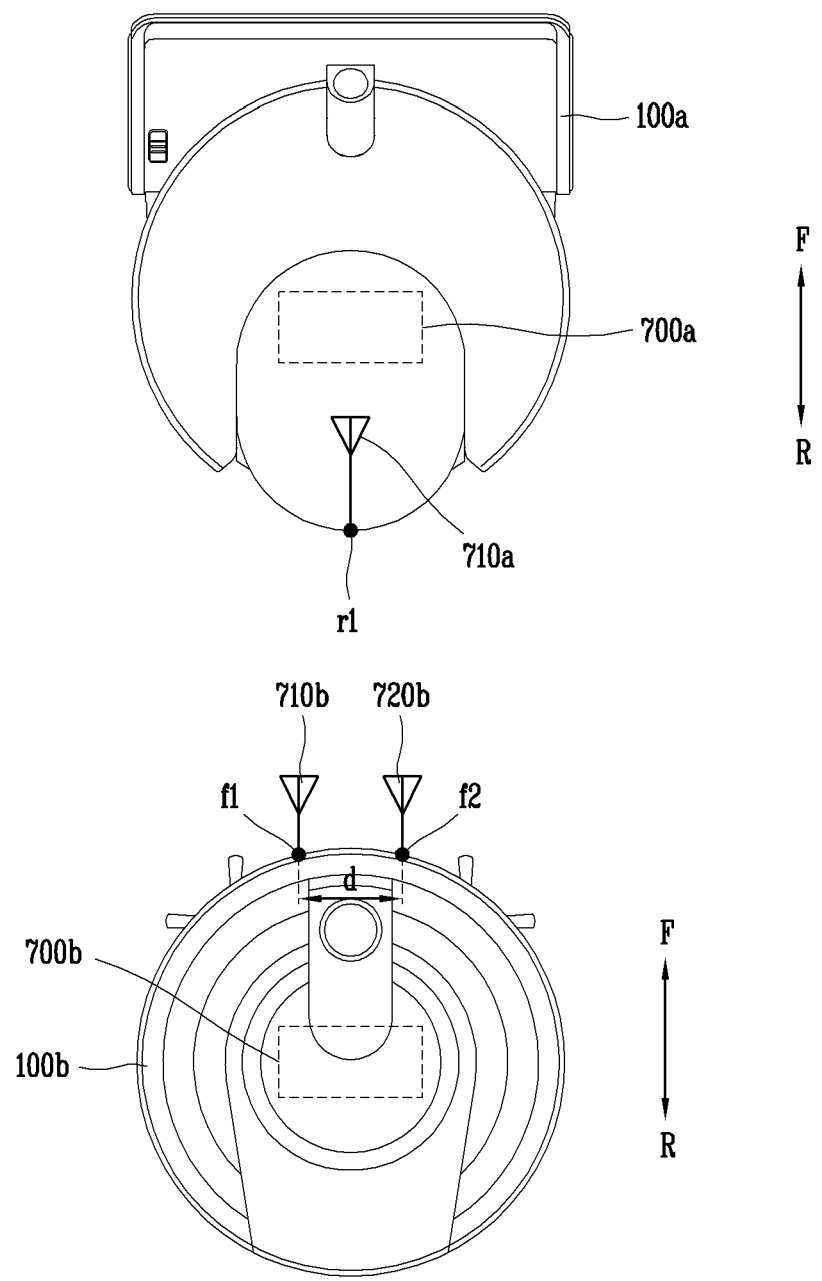
FIG. 7B is another conceptual view illustrating the plurality of autonomous mobile robots of FIG. 7A in accordance with an embodiment of the present disclosure.

FIGS. 7A and 7B are conceptual views illustrating a plurality of autonomous mobile robots in accordance with one embodiment of the present disclosure.

First, referring to FIG. 7A, the first mobile robot 100a of the present disclosure may include one antenna 710a provided on one point of the first mobile robot (main body) and configured to transmit and receive signals.

The one antenna 710a may be configured to transmit and receive various signals. For example, the antenna 710a may be configured to transmit and receive at least one of an Ultra-WideBand (UWB) signal, a signal output by one of wireless communication technologies (e.g., one of Zigbee, Z-wave, Blue-tooth, and UWB), an infrared signal, a laser signal, and an ultrasonic signal.

The antenna 710a may be connected to a module (or a sensor) that transmits and/or receives (or generates) a signal, and may play a role of transmitting the signal generated in the module (or sensor) or receiving a signal transmitted from outside.

The module (or sensor) that transmits/receives (or generates) the signal may include various communication modules included in the communication unit 1100 or may include various sensors included in the sensing unit 1400.

The first mobile robot 100a may include a UWB module 700a for transmitting and receiving (or generating) ultra-wideband (UWB) signals. The UWB module 700a included in the first mobile robot 100a may be a UWB tag 700a.

The one antenna 710a may be electrically connected to the UWB tag 700a and may output a signal (e.g., UWB signal) under the control of the UWB tag 700a.

The first mobile robot 100a may include at least one antenna in one UWB tag 700a. In certain embodiments, for cost reduction, only one antenna 710a may be (electrically) connected to one UWB tag 700a although it should be noted that the present disclosure is not limited thereto.

Hereinafter, the one antenna 710a will be referred to as an antenna 710a of the first mobile robot.

The one point of the first mobile robot 100a on which the antenna 710a of the first mobile robot is disposed may vary, and may be predetermined at the time of product manufacture or determined/changed by the user.

As one example, as illustrated in FIG. 7A, the one point of the first mobile robot 100a on which the antenna 710a of the first mobile robot is located may be a center c (a central portion, a central area, or center point) of the first mobile robot.

That is, the antenna 710a of the first mobile robot 100a may be disposed (located) at the center c of the first mobile robot 100a.

The antenna 710a of the first mobile robot may be provided on the surface of the first mobile robot 100a (main body) or may be disposed in the interior (inner space) of the first mobile robot 100a.

For example, the antenna 710a of the first mobile robot 100a may be disposed on a center point of an upper surface of the first mobile robot 100a.

As another example, the antenna 710a of the first mobile robot 100a may be disposed at the center c inside the first mobile robot 100a.

Even if the antenna 710a of the first mobile robot is provided inside the first mobile robot 100a, a signal transmitted/received through the antenna 710a of the first mobile robot may pass through the main body of the first mobile robot 100a. Therefore, the antenna 710a of the first mobile robot 100 may transmit and receive the signal through the main body of the first mobile robot 100a.

According to the present disclosure, as the antenna 710a of the first mobile robot is disposed at the center (or central portion) c of the first mobile robot, an error rate may be lowered when the second mobile robot determines the relative position of the first mobile robot.

This is because degrees of intensities or qualities of signals that are deteriorated (lowered or attenuated) may be the same/similar, which may result from that distances by which signals output from the antenna 710a of the first mobile robot pass through the main body are all the same when the antenna 710a of the first mobile robot is disposed at the center c of the first mobile robot.

As another example, as illustrated in FIG. 7B, the one point of the first mobile robot 100a on which the antenna 710a of the first mobile robot is located may be a rear area r1 of the first mobile robot (or a rear side on the main body of the first mobile robot, one point located on the rear of the first mobile robot, or the like).

According to the present disclosure, the first mobile robot can smoothly transmit and receive signals to and from the second mobile robot which may be traveling behind the first mobile robot by arranging the antenna 710a of the first mobile robot in the rear area r1 of the first mobile robot.

Even though the antenna 710a of the first mobile robot is disposed on an arbitrary point, the module (or sensor) (e.g., the UWB tag 700a) which transmits and receives signals to and from the antenna 710a of the first mobile robot (or generates the signals) may be electrically connected to the antenna 710a of the first mobile robot.

The present disclosure may be configured to output a signal generated in the module (or sensor) (e.g., the UWB tag 700a) through the antenna 710a of the first mobile robot and receive a signal received from outside through the antenna 710a of the first mobile robot so as to transfer to the module (or sensor).

The first mobile robot 100a may be configured to output (send) or receive signals in all directions through the antenna 710a of the first mobile robot. Also, the first mobile robot 100a may be configured to output or receive signals only in an arbitrary area (or an arbitrary direction) through the antenna 710a of the first mobile robot.

On the other hand, the second mobile robot 100b of the present disclosure, as illustrated in FIGS. 7A and 7B, may include a first antenna 710b and a second antenna 720b provided on the main body 100b and disposed on front areas (or the front side) f1 and f2 of the main body 100b so as to transmit and receive signals to and from the antenna 710a of the first mobile robot.

The first and second antennas 710b and 720b may be provided on the main body of the second mobile robot 100b (or the second mobile robot main body 100b). The main body 100b may include a front area and a rear area. The first and second antennas 710b and 720b may be provided on the second mobile robot main body 100b and may be located on a front area of the main body 100b (or at the front area on the main body 100b).

The front area may refer to one area on the second mobile robot main body 100b and may refer to a front area of an entire area of the second mobile robot body 100b. The entire area of the main body 100b may include a front area and a rear area.

The front area may correspond to an area located at a front side of areas (front area and rear area) of the second mobile robot main body 100b, which are divided by a reference line penetrating through the center of the second mobile robot main body 100b and extending in left and right directions.

Also, the front area may correspond to an area located at a front side among four areas of the second mobile robot main body 100b if the second mobile robot main body 100b is divided into an area located at the front, an area at the rear, an area located at the left and an area located at the right (i.e., the four areas).

The first antenna 710b and the second antenna 720b, as illustrated in FIGS. 7A and 7B, may be provided on the second mobile robot main body 100b and may be located at two arbitrary points on the front (or front area) of the second mobile robot main body 100b.

For example, the first antenna 710b and the second antenna 720b may be disposed areas f1 and f2 located at the front side of the second mobile robot main body on a boundary where an upper surface and a side surface of the second mobile robot main body 100b meet each other.

As another example, the first antenna 710b and the second antenna 720b may be disposed on an area, facing the front, of the side surface of the second mobile robot main body 100b.

As another example, the first antenna 710b and the second antenna 720b may be disposed on an area located on the front of the upper surface of the second mobile robot main body 100b.

The first antenna 710b and the second antenna 720b may be disposed to have a predetermined distance d. For example, the first antenna 710b and the second antenna 720b may be disposed adjacent to each other with a predetermined distance d.

Also, the first antenna 710b and the second antenna 720b may be disposed to be symmetric with each other in right and left directions with respect to the front of the second mobile robot main body 100b.

As illustrated in FIGS. 7A and 7B, the first antenna 710b and the second antenna 720b may be disposed to be symmetric with each other in right and left directions with respect to a reference line which penetrates through the center of the second mobile robot main body 100b and extends toward the front side.

The first antenna 710b and the second antenna 720b may be disposed symmetrically to have the same distance from the reference line, and may be disposed so that a distance therebetween is a predetermined distance d.

The predetermined distance d may have a significantly shorter value than a width of the second mobile robot main body 100b. For example, the first antenna 710b and the second antenna 720b may be disposed to have a gap of several centimeters, and may also be disposed on areas adjacent to each other.

However, the present disclosure is not limited to this, and the first antenna 710b and the second antenna 720b may alternatively be disposed on one of the rear area, the left area or the right area of the main body of the second mobile robot 100b.

The first antenna 710b and the second antenna 720b may also be disposed on different areas of the second mobile robot main body 100b (e.g., the first antenna 710b may be disposed on the front area and the second antenna 720b may be disposed on the rear area).

In the present disclosure, in some embodiments, both the first antenna 710b and the second antenna 720b may be disposed on the front areas f1, f2. However, the configuration described herein may also be equally/similarly applied even to a case where the first and second antennas 710b and 720b are disposed on any one of the rear, left, and right areas, or on different areas.

According to the present disclosure, by arranging the first antenna 710b and the second antenna 720b on the front area of the second mobile robot main body 100b, a signal received from the first mobile robot 100a that is traveling ahead of the second mobile robot 100b may be received directly without passing through the second mobile robot main body 100b.

In this case, the signal may be received through the first antenna 710b and the second antenna 710b, not via the second mobile robot main body 100b, which may result in preventing attenuation or lowering of intensity and quality of the signal.

The first antenna 710b and the second antenna 720b, as described in relation to the antenna 710a of the first mobile robot, may be electrically connected to the module (or sensor) provided in the second mobile robot 100b for generating (or transmitting and receiving) a signal.

The first antenna 710b and the second antenna 720b may be configured to transmit and receive signals to and from the antenna 710a of the first mobile robot.

The first antenna 710b and the second antenna 720b may be configured to transmit and receive various signals, for example, a UWB signal, an infrared signal, a laser signal, and an ultrasonic signal.

The first antenna 710b and the second antenna 720b may be configured to transmit and receive various signals. For example, the antenna 710a may be configured to transmit and receive at least one of an Ultra-WideBand (UWB) signal, a signal output by one of wireless communication technologies (e.g., one of Zigbee, Z-wave, Blue-tooth, and UWB), an infrared signal, a laser signal, and an ultrasonic signal.

The module (or sensor) that transmits/receives (or generates) the signal may include various communication modules included in the communication unit 1100 or may include various sensors included in the sensing unit 1400.

The second mobile robot 100b may include, for example, a UWB module 700b that transmits/receives a UWB signal. The UWB module 700b included in the second mobile robot 100b may be a UWB anchor 700b.

The first antenna 710b and the second antenna 720b may be electrically connected to the UWB anchor 700b and output a signal (e.g., UWB signal) under the control of the UWB anchor 700b.

The second mobile robot 100b may include one UWB anchor 700b and the first antenna 710b and the second antenna 720b may be electrically connected to the one UWB anchor 700b.

The UWB anchor 700b included in the second mobile robot 100b may include three or more antennas. In certain embodiments, for cost reduction, only two antennas 710b and 720b may be (electrically) connected to the one UWB anchor 700b although the present disclosure is not limited thereto.

As aforementioned, signals transmitted and received between the antenna 710a of the first mobile robot and the first antenna 710b and the second antenna 720b of the second mobile robot 100b may pass through the main body of the first mobile robot 100a and the main body of the second mobile robot 100b.

For example, when the signal is a UWB signal, the signal may have a high frequency and thus may have a characteristic of advancing through an object.

The second mobile robot 100b according to the present disclosure may be configured so that a signal output from the antenna 710a of the first mobile robot can pass (penetrate) therethrough. For example, the first antenna 710b and the second antenna 720b may receive a UWB signal output from the antenna 710a of the first mobile robot through the main body of the second mobile robot 100b.

For example, when the first antenna 710b and the second antenna 720b are located on a front area of the main body of the second mobile robot 100b (for example, on a forefront point, on a boundary where an upper surface and a side surface meet, on a front area of the side surface, or on a forefront area of the upper surface), the first antenna 710b and the second antenna 720b may be configured to receive signals, which may be transmitted in all directions except for the front of the main body of the second mobile robot 100b, through the main body of the second mobile robot 100b.

Intensity of the signal received by the first antenna 710b and the second antenna 720b may be reduced when the signal is received through the main body of the second mobile robot 100b.

Intensity W1 of a signal received directly by the first antenna 710b and the second antenna 720b, not through the second mobile robot (or the second mobile robot main body) 100b after being output from the antenna 710a of the first mobile robot may be stronger than intensity W2 of a signal received by the first antenna 710b and the second antenna 720b through the second mobile robot 100b after being output from the antenna 710a of the first mobile robot (W1>W2).

This is because the signal may be attenuated while passing through the main body and thereby intensity or quality of the signal may be deteriorated.

For example, the case where the signal is received directly by the first antenna 710b and the second antenna 720b, not through the second mobile robot 100b after being output from the antenna 710a of the first mobile robot, may correspond to a case where the first mobile robot 100a is located at the front of the second mobile robot 100b and the first antenna 710b and the second antenna 720b are arranged on the front area of the second mobile robot (or the second mobile robot main body) 100b.

For example, when the signal is output from the antenna 710a of the first mobile robot and then received by the first antenna 710b and the second antenna 720b through the second mobile robot 100b, the first mobile robot 100a may be located in a direction except for the front of the second mobile robot 100b (e.g., in a left, right or rear direction of the second mobile robot), and the first antenna 710b and the second antenna 720b may be arranged on the front area of the second mobile robot 100b.

The control unit 1800 of the second mobile robot 100b may determine (decide) whether the signal output from the antenna 710a of the first mobile robot 100a is received through the second mobile robot 100b or without passing through the second mobile robot 100b, on the basis of intensity of the signal received by the first antenna 710b and the second antenna 720b.

The control unit 1800 of the second mobile robot 100b may determine whether the first mobile robot 100a is located at the front or rear of the second mobile robot with respect to the front of the second mobile robot 100b, on the basis of the intensity of the signal received by the first and second antennas 710b and 720b.

The present disclosure also provides a plurality of autonomous mobile robots that the second mobile robot 100b may accurately determine a relative position of the first mobile robot 100a using only two antennas (receiving antennas) 710b and 720b, on the basis of intensity of a signal received through the first antenna 710b and the second antenna 720b.

Hereinafter, description will be given of a method in which the second mobile robot determines the relative position of the first mobile robot using only two receiving antennas, with reference to the accompanying drawings.

Figure 8:
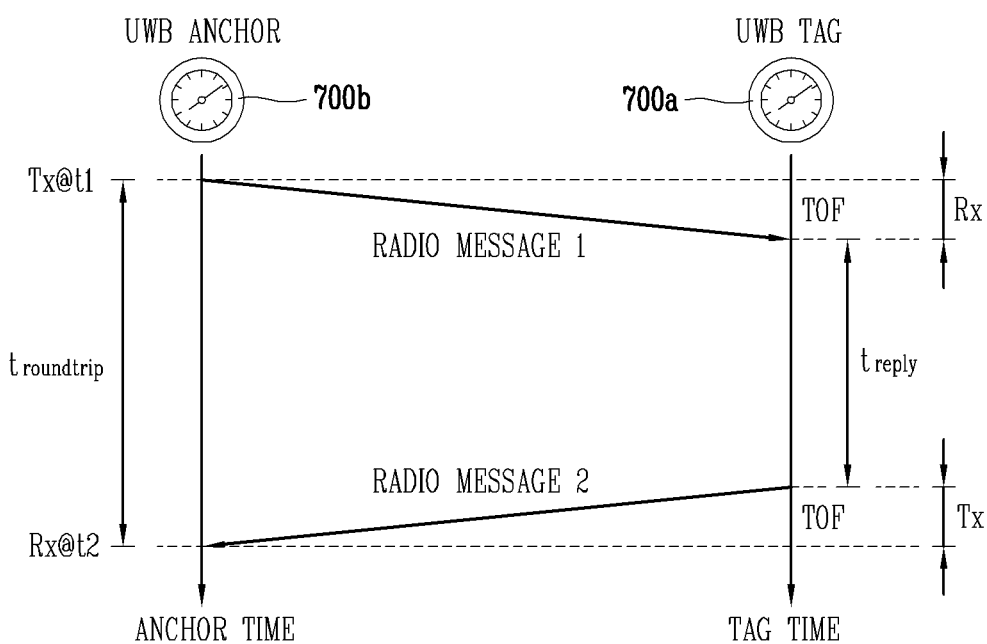
FIG. 8 is a conceptual view illustrating a method of determining a distance between a first mobile robot and a second mobile robot using UWB modules in accordance with an embodiment of the present disclosure.

FIG. 8 is a conceptual view illustrating a method of determining a distance between a first mobile robot and a second mobile robot using UWB modules in accordance with one embodiment of the present disclosure.

Description given with reference to FIGS. 7A and 7B may be applied to the embodiment of FIG. 8 in the same or similar manner.

The first mobile robot 100a may include one antenna 710a provided on one point of the first mobile robot and configured to transmit and receive signals.

The second mobile robot 100b may include a first antenna 710b and a second antenna 720b which may be provided on the front area of the main body 100b and configured to transmit and receive signals to and from the antenna of the first mobile robot.

The control unit 1800 of the second mobile robot 100b may determine the relative position of the first mobile robot using the signal received through the first antenna 710b and the second antenna 720b.

First, the first mobile robot 100a and the second mobile robot 100b of the present disclosure may be provided with UWB modules 700a and 700b, respectively, for transmitting and receiving UWB signals transmitted and received through the antennas 710*a*, 710*b* and 720*b*.

For example, the first mobile robot 100*a* may include a UWB tag 700*a* that transmits and receives a UWB signal, and the one antenna 710*a* of the first mobile robot may be electrically connected to the UWB tag 700*a*.

The second mobile robot 100*b* may include a UWB anchor 700*b* that transmits and receives the UWB signal and the first antenna 710*b* and the second antenna 720*b* of the second mobile robot may be electrically connected to the UWB anchor 700*b*.

The antenna 710*a* of the first mobile robot and the first and second antennas 710*b* and 720*b* of the second mobile robot may transmit and receive signals (UWB signals) generated by the UWB tag 700*a* and the UWB anchor 700*b*.

For example, the UWB tag 700*a* and the UWB anchor 700*b* may transmit and receive signals (UWB signals) through the antenna 710*a* of the first mobile robot and the first and second antennas 710*b* and 720*b* of the second mobile robot.

Hereinafter, description will be given of a method of measuring (determining, calculating) a distance between the antenna 710*a* of the first mobile robot and the first antenna 710*b* of the second mobile robot, based on a signal transmitted and received between the UWB tag 700 and the UWB anchor 700*b* (or between the antenna 710*a* connected to the UWB tag 700*a* and the first antenna 710*b* connected to the UWB anchor).

The following description will be applied equally/similarly to a method of measuring (determining) a distance between the antenna 710*a* of the first mobile robot and the second antenna 720*b* of the second mobile robot.

The UWB modules (or UWB sensors) may be included in the communication units 1100 of the first mobile robot 100*a* and the second mobile robot 100*b*. Because the UWB modules may be used to sense the relative positions of the first mobile robot 100*a* and the second mobile robot 100*b*, the UWB modules 700*a* and 700*b* may be included in the sensing units 1400 of the first mobile robot 100*a* and the second mobile robot 100*b*.

A UWB signal transmitted and received between the UWB tag 700*a* and the UWB anchor 700*b* may be smoothly transmitted and received within a specific space. For example, the UWB signal may pass through the first mobile robot 100*a* and/or the second mobile robot 100*b*.

Even if an obstacle is present between the first mobile robot 100*a* and the second mobile robot 100*b* (or between the antenna 710*a* of the first mobile robot and the first antenna 710*b* of the second mobile robot), when the first mobile robot 100*a* and the second mobile robot 100*b* are present within a specific space, transmission and reception of the UWB signal may be performed, which may increase accuracy.

The first mobile robot and the second mobile robot of the present disclosure may measure a time during which a signal is transmitted and received between the UWB tag 700*a* and the UWB anchor 700*b* so as to calculate (determine) a distance between the first mobile robot and the second mobile robot (or a distance between the antenna 710*a* of the first mobile robot and the first antenna 710*b* of the second mobile robot).

In general, the UWB tag and the UWB anchor may be both UWB modules, which may be modules to transmit and receive UWB signals.

For example, the UWB module included in one robot 100*b* for calculating (determining) a relative position of another mobile robot 100*a* may be referred to as a UWB anchor, and a UWB module included in the robot 100*a* whose relative position is to be recognized may be referred to as a UWB tag.

Each of the plurality of mobile robots 100*a* and 100*b* may include one UWB sensor, or the first mobile robot 100*a* may include a single UWB sensor, and the second mobile robot 100*b* following the first mobile robot 100*a* may include a single UWB sensor and at least one antenna or at least two UWB sensors, so that the first mobile robot 100*a* can measure distances to the second mobile robot 100*b* at two different time points t1 and t2.

The UWB sensor of the first mobile robot 100*a* and the UWB sensor of the second mobile robot 100*b* may radiate UWB signals to each other, and measure a distance and relative speed using Time of Arrival (ToA) or Time of Flight (ToF) which is a time that the signal comes back by being reflected from the robot. However, the present disclosure is not limited to this, and may recognize the relative positions of the plurality of mobile robots 100*a* and 100*b* using a Time Difference of Arrival (TDoA) or Angle of Arrival (AoA) positioning technique.

For example, as illustrated in FIG. 8, the control unit 1800 of the second mobile robot 100*b* may control the UWB anchor 700*b* to output a first signal (Radio message 1) through at least one of the first antenna 710*b* and the second antenna 720*b*.

The control unit 1800 of the second mobile robot 100*b* may output the first signal from the UWB anchor 700*b* through at least one of the first antenna 710*b* and the second antenna 720*b*.

The first signal may be received in the UWB tag through the antenna 710*a* of the first mobile robot 100*a*.

The control unit 1800 of the first mobile robot 100*a* may control the UWB tag 700*a* to output the second signal (Radio message 2) through the antenna 710*a* of the first mobile robot 100*a*, in response to the reception of the first signal.

The second signal may include information related to a delay time t_reply which may be calculated based on a time at which the first mobile robot 100*a* has received the first signal and a time at which the first mobile robot 100*a* has output (transmitted) the second signal.

The control unit 1800 of the second mobile robot 100*b* may receive the second signal through the UWB anchor 700*b* (through the first antenna 710*b* of the second mobile robot 100*b*).

The control unit of the second mobile robot 100*b* may calculate (determine) a signal transmission time, namely, Time of Flight (ToF), between the antenna 710*a* of the first mobile robot and the first antenna 710*b* of the second mobile robot using an output time t1 of the first signal, a received time t2 of the second signal in the first antenna 710*b* of the second mobile robot, and the delay time t_reply included in the second signal.

The signal transmission time (i.e., TOF) may refer to a time for which the signal (UWB signal) is transmitted from the antenna 710*a* of the first mobile robot to the first antenna 710*b* of the second mobile robot (or from the first antenna 710*b* of the second mobile robot to the antenna 710*a* of the first mobile robot).

The control unit 1800 of the second mobile robot 100*b* may calculate a distance between the first mobile robot 100*a* and the second mobile robot 100*b* (accurately, a distance between the antenna 100*a* of the first mobile robot and the first antenna 710*b* of the second mobile robot), using the output time t1 of the first signal, the received time t2 of the second signal in the first antenna 710*b* of the second mobile robot, and the delay time t_reply included in the second signal. Here, c in FIG. 8 denotes speed of light.

For example, the control unit of the second mobile robot 100b may calculate (determine) the distance (first distance) between the first antenna 710a of the first mobile robot and the first antenna 710b of the second mobile robot by multiplying the calculated TOF by the speed of light.

To this end, the control unit of the second mobile robot 100b may also calculate (determine) the distance between the antenna 710a of the first mobile robot and the second antenna 720b of the second mobile robot.

For example, the control unit of the second mobile robot 100b may calculate a signal transmission time, namely, Time of Flight (ToF') between the antenna 710a of the first mobile robot and the second antenna 720b of the second mobile robot, using the output time t1 of the first signal, a received time t2' of the second signal in the second antenna 720b of the second mobile robot, and the delay time t_reply included in the second signal.

The signal transmission time (i.e., TOF) may refer to a time for which the signal (UWB signal) is transmitted from the antenna 710a of the first mobile robot to the second antenna 720b of the second mobile robot (or from the second antenna 720b of the second mobile robot to the antenna 710a of the first mobile robot).

The control unit 1800 of the second mobile robot 100b may calculate the distance between the first mobile robot 100a and the second mobile robot 100b (accurately, the distance between the antenna 100a of the first mobile robot and the second antenna 720b of the second mobile robot), using the output time t1 of the first signal, the received time t2' of the second signal in the second antenna 720b of the second mobile robot, and the delay time t_reply included in the second signal.

For example, the control unit of the second mobile robot 100b may calculate (determine) the distance (second distance) between the antenna 710a of the first mobile robot and the second antenna 720b of the second mobile robot by multiplying the calculated TOF' by the speed of light.

The control unit 1800 of the second mobile robot 100b may measure each time t2 and t2' at which the second signal is received in the first antenna 710b and the second antenna 720b of the second mobile robot, in a state where the first antenna 710b and the second antenna 720b of the second mobile robot are activated at the same time.

Accordingly, the control unit 1800 of the second mobile robot 100b may calculate the first distance between the antenna 710a of the first mobile robot and the first antenna 710b of the second mobile robot and the second distance between the antenna 710a of the first communication system and the second antenna 720b of the second mobile robot, respectively, on the basis of the time t1 at which the first signal is output through at least one of the first and second antennas 710b and 720b, each time t2 and t2' at which the second signal is received by the first and second antennas 710b and 720b, and the delay time t_reply included in the second signal.

The control unit 1800 of the second mobile robot 100b may also sequentially calculate the first distance and the second distance by sequentially activating the first antenna 710b and the second antenna 720b of the second mobile robot.

For example, the control unit 1800 of the second mobile robot 100b may calculate the first distance in a state in which the first antenna 710b of the second mobile robot is activated and the second antenna 720b is deactivated.

Afterwards, when the first distance is calculated, the control unit 1800 of the second mobile robot 100b may calculate the second distance by deactivating the first antenna 710b and activating the second antenna 720b.

On the other hand, since only the two antennas 710b and 720b are provided in the second mobile robot, the triangulation scheme may not be utilized.

The present disclosure may determine direction information (or angle information) related to the first mobile robot based on the forward direction of the second mobile robot, using an Angle of Arrival (AoA) positioning technique, through two UWB anchors (or two antennas).

Hereinafter, description will be given of a method of determining the relative positions of the first mobile robot 100a and the second mobile robot 100b using an AoA positioning technique. In order to use the AoA positioning technique, each of the first mobile robot 100a and the second mobile robot 100b may be provided with one receiving antenna or a plurality of receiving antennas. The first mobile robot 100a and the second mobile robot 100b may determine their relative positions using a difference (or phase difference) of angles that the receiving antennas provided in the robots, respectively, receive signals. To this end, each of the first mobile robot 100a and the second mobile robot 100b may be able to sense an accurate signal direction coming from a receiving antenna array.

Since signals, for example, UWB signals, generated in the first mobile robot 100a and the second mobile robot 100b, respectively, may be received only in specific directional antennas, they can determine (recognize) received angles of the signals. Under assumption that positions of the receiving antennas provided in the first mobile robot 100a and the second mobile robot 100b are known, the relative positions of the first mobile robot 100a and the second mobile robot 100b may be calculated based on signal receiving directions of the receiving antennas.

If one receiving antenna is installed, a 2D position may be calculated in a space of a predetermined range. On the other hand, if at least two receiving antennas are installed, a 3D position may be determined. In the latter case, a distance d between the receiving antennas may be used for positioning in order to accurately determine a signal receiving direction.

For example, one UWB tag (or one antenna) may be provided in the first mobile robot 100a, and at least two UWB anchors (or at least two antennas) may be provided in the second mobile robot 100b. The second mobile robot 100b may receive the UWB signal transmitted from the UWB tag of the first mobile robot 100a through each of the at least two UWB anchors (or the at least two antennas).

Thereafter, the second mobile robot 100b may determine position information (or angle information) where the first mobile robot 100a is located with reference to a forward direction of the second mobile robot 100b, by using a phase difference between the UWB signals received through the at least two UWB anchors (at least two antennas) and a distance between the at least two UWB anchors (or at least two antennas).

For example, the second mobile robot of the present disclosure may extract distance information between the first mobile robot and the second mobile robot using the ToF scheme, and determine direction information (or angle information) in which the first mobile robot is located with respect to the forward direction of the second mobile robot 100b using the AoA scheme. Further, the second mobile robot may determine the relative position of the first mobile robot using the distance information and the angle information.

In addition, the present disclosure may determine the relative position of the first mobile robot based on intensities of signals received through two antennas, even if the second mobile robot is provided with only the two antennas 710b and 720b.

Hereinafter, description will be given in more detail of a method in which the second mobile robot determines the relative position of the first mobile robot using two antennas, with reference to the accompanying drawings.

Figure 9:
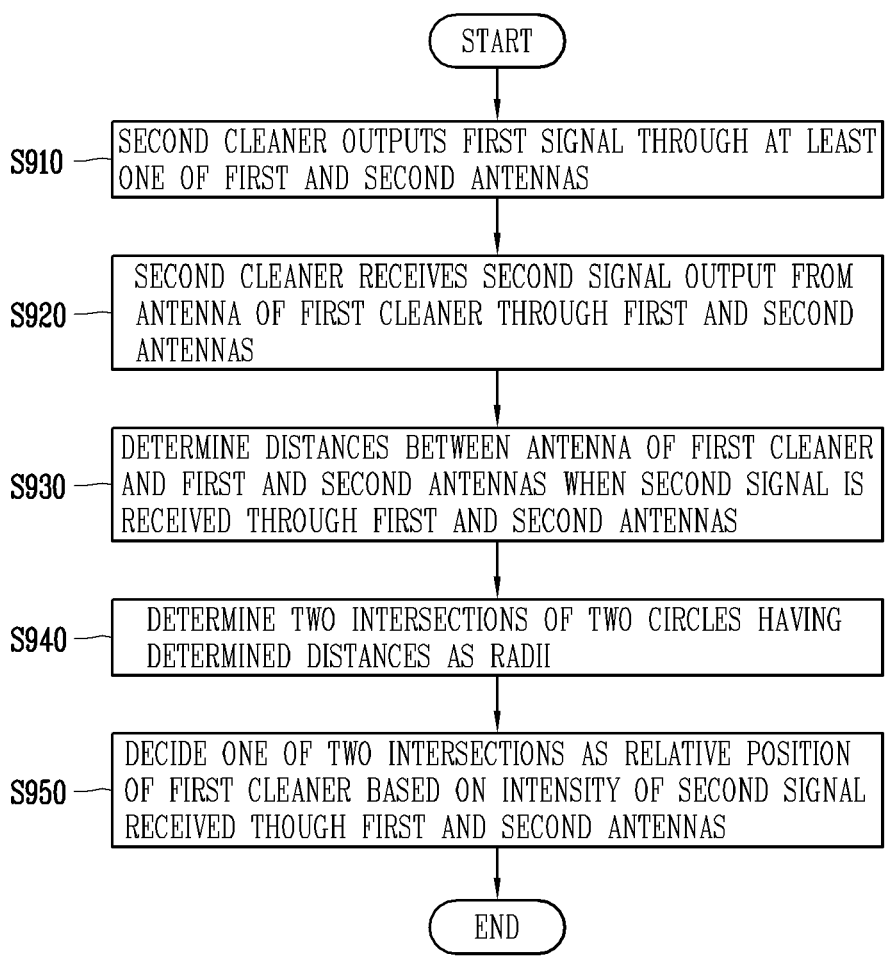
FIG. 9 is a flowchart illustrating a representative control method according to an embodiment of the present disclosure.
Figure 10:
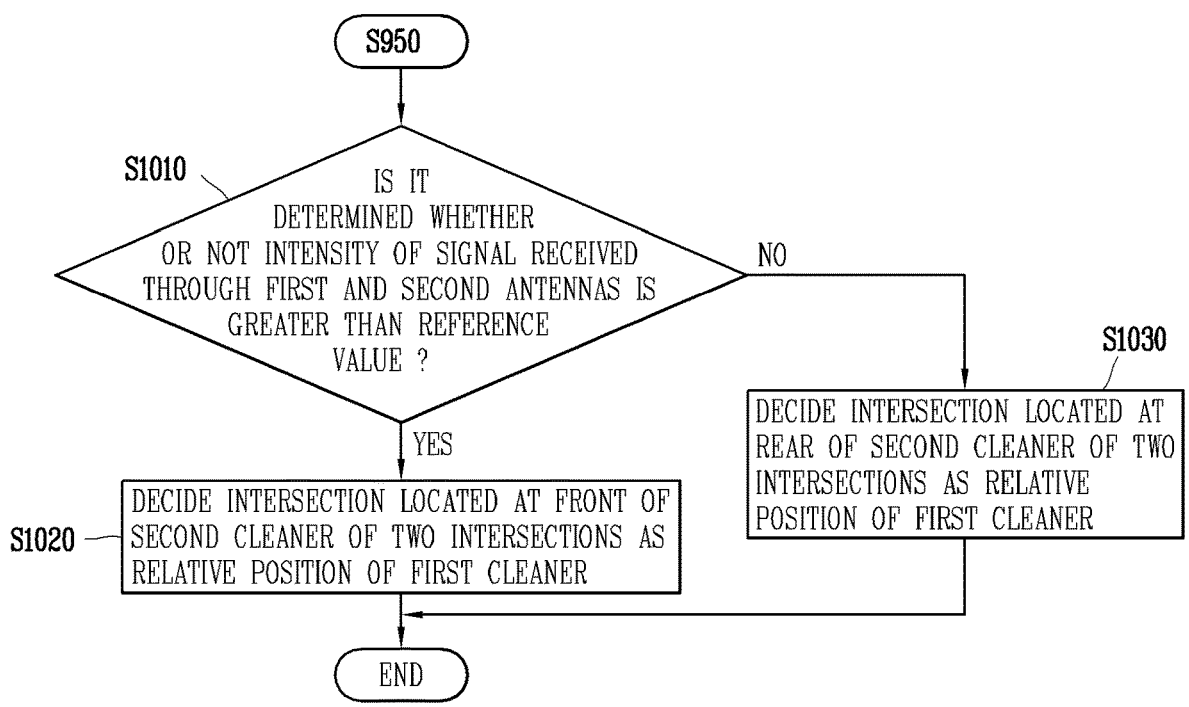
FIG. 10 is a flowchart illustrating a part of the control method of FIG. 9 according to an embodiment of the present disclosure.
Figure 11A:
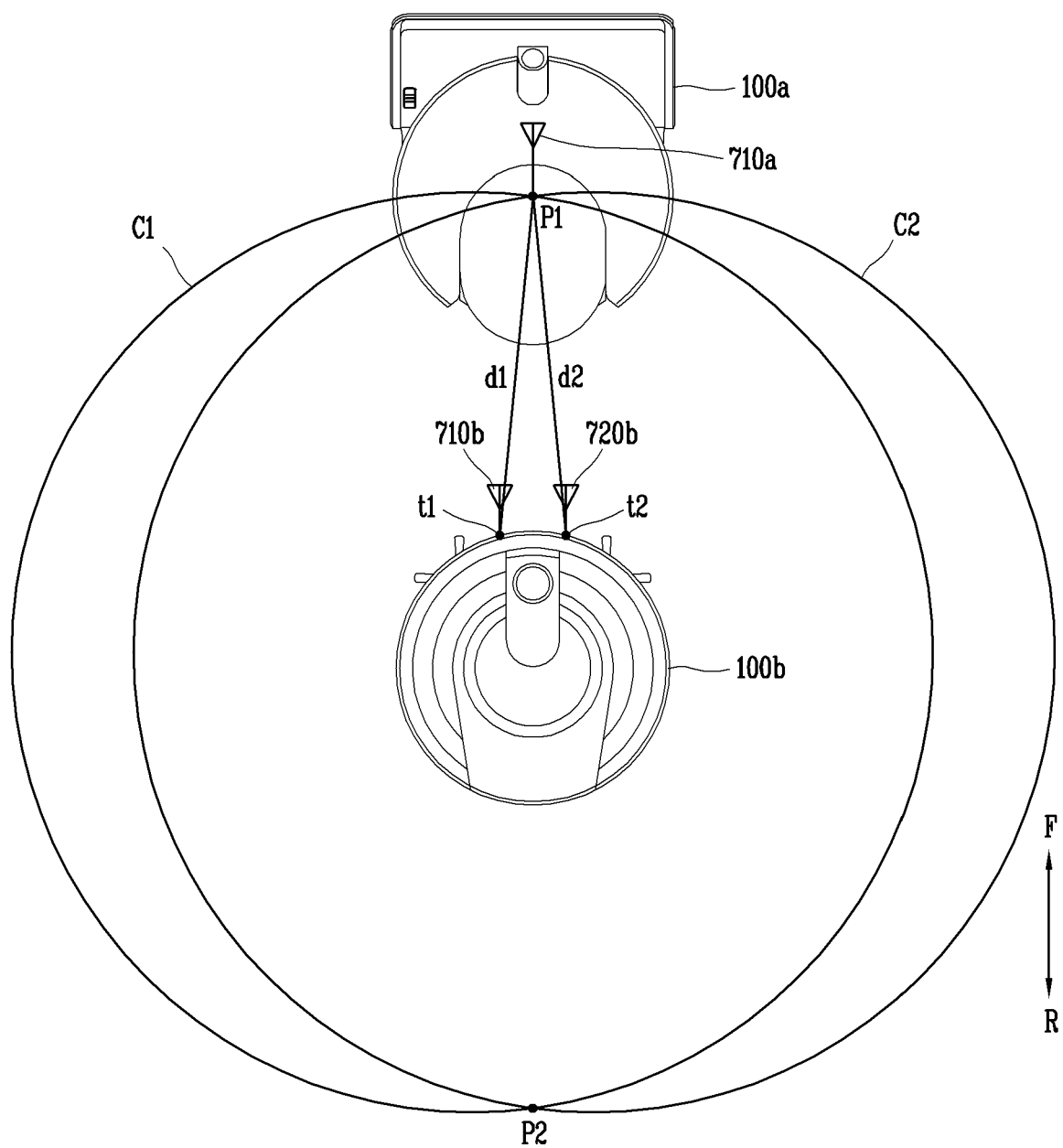
FIG. 11A is a conceptual view illustrating the method of FIGS. 9 and 10, according to an embodiment of the present disclosure.
Figure 11B:
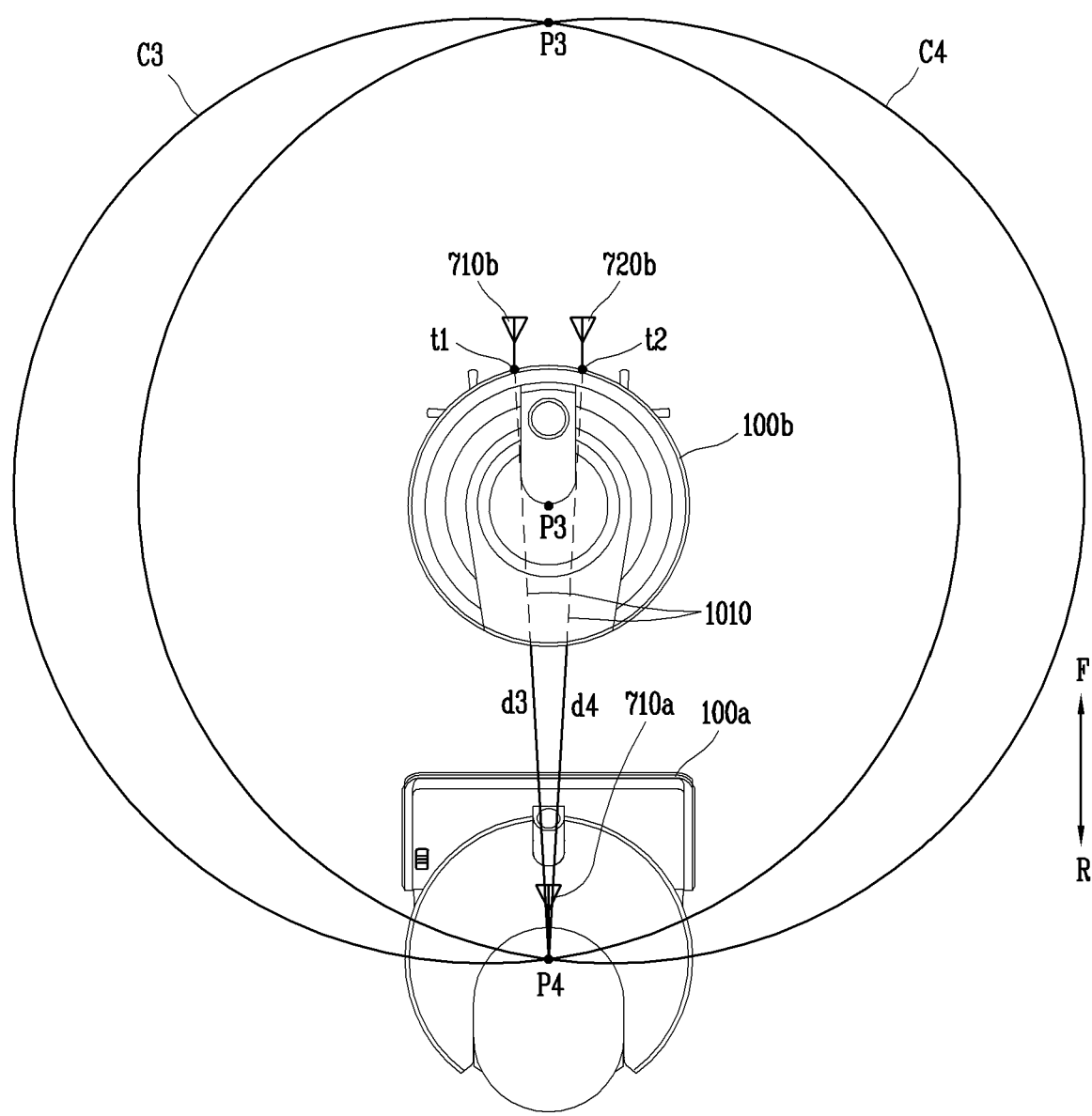
FIG. 11B is another conceptual view illustrating the method of FIGS. 9 and 10, according to an embodiment of the present disclosure.
Figure 12:
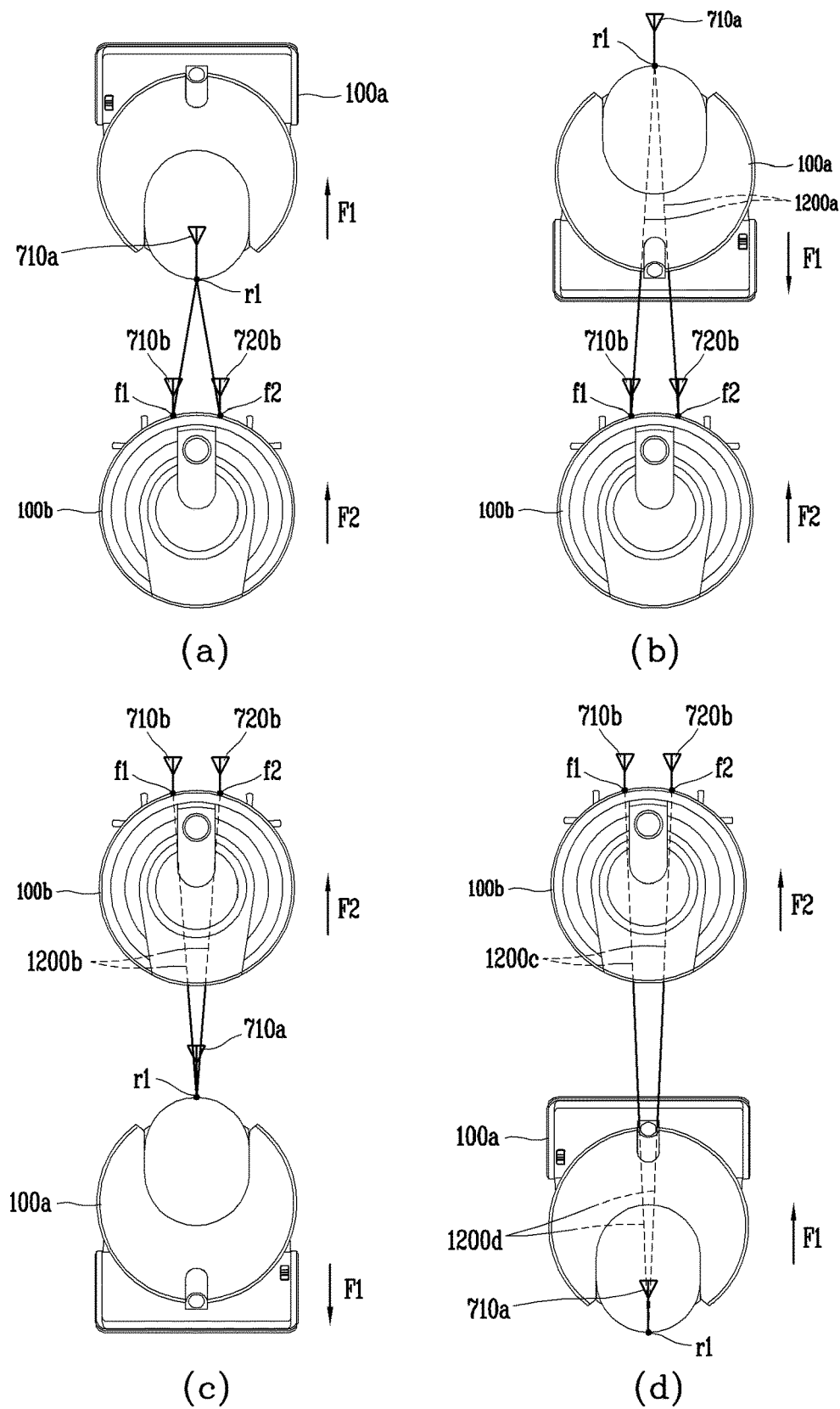
FIG. 12 is another conceptual view illustrating the method of FIGS. 9 and 10, according to an embodiment of the present disclosure.

FIG. 9 is a flowchart illustrating a representative control method according to the present disclosure, and FIG. 10 is a flowchart illustrating in detail a part of the control method shown in FIG. 9. FIGS. 11A, 11B, and 12 are conceptual views illustrating the method illustrated in FIGS. 9 and 10.

The description given with reference to FIGS. 7A to 8 will be applied equally/similarly to the following description.

The first mobile robot 100a may include one antenna 710a provided on one point of the first mobile robot and configured to transmit and receive signals.

The second mobile robot 100b may include a first antenna 710b and a second antenna 720b which are provided on the front area of the main body 100b and configured to transmit and receive signals to and from the antenna of the first mobile robot.

The control unit 1800 of the second mobile robot 100b may determine the relative position of the first mobile robot using a signal received through the first antenna 710b and the second antenna 720b.

First, the control unit 1800 of the second mobile robot 100b may output a first signal (Radio message 1) to the first mobile robot 100a through at least one of the first antenna 710b and the second antenna 720b provided in the second mobile robot 100b (S910).

The control unit 1800 of the second mobile robot 100b may control the UWB anchor 700b to output the first signal through at least one of the first antenna 710b and the second antenna 720b.

To this end, the control unit of the first mobile robot 100a may receive the first signal through the one antenna 710a provided on one point of the first mobile robot 100a.

The first signal may be, for example, a UWB signal. However, the present disclosure is not limited to this, and the first signal may include all the signals that can pass through the first mobile robot 100a or the second mobile robot 100b.

The control unit of the first mobile robot 100a may output a second signal to the second mobile robot 100b, in response to the first signal.

The control unit of the first mobile robot 100a may control the UWB tag 700a to output the second signal through the antenna 710a of the first mobile robot when the first signal is received.

Likewise, the second signal may be a UWB signal. However, the present disclosure is not limited to this, and the second signal may include all the signals that can pass through the first mobile robot 100a or the second mobile robot 100b.

The second signal may include information related to a delay time t_reply which may be calculated based on a time at which the first mobile robot 100a has received the first signal and a time at which the first mobile robot 100a has output (transmitted) the second signal.

The control unit 1800 of the second mobile robot 100b may receive the second signal output from the antenna 710a of the first mobile robot through each of the first antenna 710b and the second antenna 720b provided on the front area of the second mobile robot (or the second mobile robot main body) 100b (S920).

When the second signal is received by the first antenna 710b and the second antenna 720b, respectively, the control unit 1800 of the second mobile robot 100b may determine a first distance between the antenna 710a of the first mobile robot and the first antenna 710b of the second mobile robot and a second distance between the antenna 710a of the first mobile robot and the second antenna 720b of the second mobile robot (S930).

In other words, the control unit 1800 of the second mobile robot 100b may determine the first distance between the antenna 710a of the first mobile robot and the first antenna 710b of the second mobile robot and the second distance between the antenna 710a of the first mobile robot and the second antenna 720b of the second mobile robot, on the basis of the signals (the first signal and the second signal) transmitted and received through the antenna 710a of the first mobile robot and the first antenna 710b and the second antenna 720b of the second mobile robot.

The method of determining (calculating) the first distance and the second distance can be understood in view of the description of FIG. 8.

The control unit 1800 of the second mobile robot 100b may determine two intersections of two circles having the determined distances (the first distance and the second distance) as radii, respectively (S940).

Specifically, the control unit 1800 of the second mobile robot 100b may determine two intersections of a first circle that the first antenna 710b is a center and the first distance is a radius and a second circle that the second antenna 720b is a center and the second distance is a radius.

The control unit 1800 of the second mobile robot 100b may then determine a relative position of the first mobile robot 100a (or a position (relative position) of the antenna 710a of the first mobile robot), based on intensity of the signal (second signal) received through each of the first antenna 710b and the second antenna 720b (S950).

If the antenna of the first mobile robot 100a and the first antenna 710b and the second antenna 710b of the second mobile robot 100b are all located on one straight line, the two circles may generate only one intersection. In this case, the position (coordinates) corresponding to the one intersection may be the relative position of the first mobile robot (or the position of the antenna 710a of the first mobile robot).

On the other hand, in more cases, the first antenna 710b and the second antenna 720b of the second mobile robot 100b may be disposed on the front of the second mobile robot 100b to be symmetric with respect to the front of the second mobile robot 100b, and the first mobile robot 100a may be located ahead of the second mobile robot 100b. Thus, the case where the antenna 710a of the first mobile robot and the first antenna 710b of the second mobile robot of the second mobile robot are all placed on the straight line may occur less. Accordingly, the two circles may generally have two intersections.

On the other hand, since the second mobile robot 100b may be provided with only the two antennas 710b and 720b, it may be problematic to determine which of the two intersections is the relative position of the first mobile robot.

The present disclosure may determine one of the two intersections as the relative position of the first mobile robot based on the intensity of the signal received through the first antenna 710b and the second antenna 720b.

In other words, the control unit 1800 of the second mobile robot 100b may determine whether the first mobile robot 100a is located at the front or rear of the second mobile robot with respect to the front of the second mobile robot 100b, on the basis of the intensity of the signal received through the first and second antennas 710b and 720b.

As illustrated in FIGS. 7A, 7B, and 8, the signals (the first signal and the second signal) transmitted and received between the antenna 710a of the first mobile robot and the first antenna 710b and the second antenna 720b of the second mobile robot may pass through at least one of the first mobile robot (or first mobile robot main body) 100a and the second mobile robot (or second mobile robot main body) 100b.

However, when the signal passes through the second mobile robot 100b, the intensity of the signal may be reduced.

When the signal does not pass through the second mobile robot 100b, the intensity of the signal may not be reduced.

In addition, the intensity of the signal passing through the second mobile robot 100b may be weaker than the intensity of the signal without passing through the second mobile robot 100b.

Conversely, the intensity of the signal without passing through the second mobile robot 100b may be stronger than the intensity of the signal passing through the second mobile robot 100b.

Hereinafter, description will be given in more detail of a method of determining one of the two intersections as the relative position of the first mobile robot, based on the intensity of the signal (second signal) received by the first and second antennas 710b and 720b.

Description given with reference to FIGS. 7A to 9 may be applied to the embodiment of FIG. 10 in the same or similar manner.

The first mobile robot 100a may include one antenna 710a provided on one point of the first mobile robot and configured to transmit and receive signals.

The second mobile robot 100b may include a first antenna 710b and a second antenna 720b which may be provided on the front area of the main body 100b and configured to transmit and receive signals to and from the antenna of the first mobile robot.

The control unit 1800 of the second mobile robot 100b may determine the relative position of the first mobile robot using the signal received through the first antenna 710b and the second antenna 720b.

Referring to FIG. 10, when a signal is received through the first antenna 710b and the second antenna 720b, respectively, the control unit 1800 of the second mobile robot 100b may determine (measure) intensity of the received signal. The intensity of the signal may be expressed in the form of a value (or number, level).

The control unit 1800 of the second mobile robot 100b may determine whether the intensity of the signal (second signal) received by the first and second antennas 710b and 720b is greater than a reference value (S1010).

To this end, when the intensity of the received signal is greater than the reference value (or reference intensity), the control unit 1800 of the second mobile robot 100b may determine an intersection, which may be located at the front of the second mobile robot, of the two intersections, as the relative position of the first mobile robot (S1020).

For example, when the intensity of the signal (second signal) received by the first and second antennas 710b and 720b is greater than (greater than or equal to) the reference value (or reference intensity), the control unit of the second mobile robot may determine that the first mobile robot 100a is located at the front of the second mobile robot 100b.

If the intensity of the received signal is smaller than the reference value (or the reference intensity), the control unit 1800 of the second mobile robot 100b may determine an intersection, which may be located at the rear of the second mobile robot, of the two intersections, as the relative position of the first mobile robot (S1030).

When the intensity of the signal (second signal) received by the first and second antennas 710b and 720b is smaller than (smaller than or equal to) the reference value (or the reference intensity), the control unit of the second mobile robot 100b may determine that the first mobile robot 100a is located at the rear of the second mobile robot 100b. This is because the intensity of the signal output from the antenna 710a of the first mobile robot may be attenuated (reduced) as the signal is received through the first and second antennas 710b and 720b, located at the front of the second mobile robot 100b, via the first mobile robot (or first mobile robot main body) 100a.

The reference value (reference intensity) may be determined (set) as a value between the intensity of the signal when the signal has not passed through the second mobile robot 100b and the intensity of the signal when the signal has passed through a predetermined section of the second mobile robot 100b.

The reference value may be determined by an experimental value at the time of designing a product or determined/changed by user setting because of differences in output signal intensity of a signal output between the first mobile robot and the second mobile robot, a degree that signal intensity may be attenuated (deformed) according to a material of the second mobile robot (or main body), a length by which a signal passes through the second mobile robot, and the like.

The foregoing description will be made clearer with reference to FIGS. 11A and 11B.

Description given with reference to FIGS. 7A to 10 may be applied to the embodiment illustrated in FIGS. 11A and 11B in the same or similar manner.

The first mobile robot 100a may include one antenna 710a provided on one point of the first mobile robot and configured to transmit and receive signals.

The second mobile robot 100b may include a first antenna 710b and a second antenna 720b which are provided on the front area of the main body 100b and configured to transmit and receive signals to and from the antenna of the first mobile robot.

The control unit 1800 of the second mobile robot 100b may determine the relative position of the first mobile robot using a signal received through the first antenna 710b and the second antenna 720b.

As illustrated in FIG. 11A, the control unit 1800 of the second mobile robot 100b may determine two intersections P1 and P2 between a first circle c1 that a first distance d1 between the antenna 710a of the first mobile robot and the first antenna 710b of the second mobile robot 100b may be a radius and the first antenna 710b may be a center and a second circle c2 that a second distance d2 between the antenna 710a of the first mobile robot and the second antenna 720b of the second mobile robot may be a radius and the second antenna 720b may be a center.

When intensity of the signal received through the first antenna 710b and the second antenna 720b is equal to or greater than the reference value, the control unit 1800 of the second mobile robot 100b may determine the intersection P1 located at the front F of the second mobile robot, of the two intersections P1 and P2, as the relative position of the first mobile robot 100a.

When the intensity of the signal received through the first antenna 710b and the second antenna 720b is equal to or greater than the reference value, as illustrated in FIG. 11A, it may be a case where the first mobile robot 100a is located at the front of the second mobile robot 100b, the first and second antennas 710b and 720b are arranged on the front area of the second mobile robot (or second mobile robot main body) 100b, and the signal received through the first antenna 720b and the second antenna 720b does not pass through the main body of the second mobile robot 100b.

On the other hand, as illustrated in FIG. 11B, the control unit 1800 of the second mobile robot 100b may determine two intersections P3 and P4 between a first circle c3 that a first distance d3 between the antenna 710a of the first mobile robot and the first antenna 710b of the second mobile robot 100b may be a radius and the first antenna 710b may be a center and a second circle c4 that a second distance d4 between the antenna 710a of the first mobile robot and the second antenna 720b of the second mobile robot may be a radius and the second antenna 720b may be a center.

When the intensity of the signal received through the first antenna 710b and the second antenna 720b is smaller than the reference value, the control unit 1800 of the second mobile robot 100b may determine the intersection P4 located at the rear R of the second mobile robot, of the two intersections P3 and P4, as the relative position of the first mobile robot 100a.

When the intensity of the signal received through the first antenna 710b and the second antenna 720b is smaller than the reference value, as illustrated in FIG. 11B, it may be a case where the first mobile robot 100a is located at the rear of the second mobile robot 100b, the first and second antennas 710b and 720b are arranged on the front area of the second mobile robot (or second mobile robot main body) 100b, and the signal received through the first antenna 710b and the second antenna 720b passes through the main body of the second mobile robot 100b by a predetermined length 1010.

When the signal passes through the second mobile robot 100b by the predetermined length 1010, the intensity of the signal may be reduced and may have a value smaller than the reference value.

The control unit of the second mobile robot 100b may determine whether the intensity of the signal received through the first antenna 710b and the second antenna 720b is equal to or greater than the reference value or smaller than the reference value, and determine one of the two intersections as the relative position of the first mobile robot 100a based on the determination.

When the relative position of the first mobile robot 100a is determined, the control unit of the second mobile robot 100b may control the traveling unit 1300 to move the main body of the second mobile robot 100b toward the relative position of the first mobile robot 100a. That is, the control unit of the second mobile robot 100b may determine the relative position of the first mobile robot 100a, and control the second mobile robot main body to travel while following the first mobile robot 100a based on the determined relative position.

The control unit of the second mobile robot 100b may transmit information related to the determined relative position of the first mobile robot 100a to the first mobile robot 100a through the communication unit. The control unit of the first mobile robot 100a may determine the relative position of the second mobile robot 100b based on the information on the relative position of the second mobile robot 100b received from the second mobile robot 100b.

The control unit of the first mobile robot 100a may transmit a control signal to the second mobile robot 100b to control various operations (for example, movement, rotation, following travel, stopping, traveling path change, etc.) of the second mobile robot 100b based on the relative position of the second mobile robot 100b.

On the other hand, the control unit 1800 of the second mobile robot 100b may determine the position of the antenna 710a provided on the first mobile robot as the relative position of the first mobile robot.

In other words, the relative position of the first mobile robot determined by the second mobile robot 100b may indicate a position of one point where the antenna 710a of the first mobile robot is disposed.

For example, when the antenna 710a of the first mobile robot is provided at the center c of the first mobile robot, the relative position of the first mobile robot determined by the control unit 1800 of the second mobile robot 100b may indicate the relative position of the center c of the first mobile robot with respect to the second mobile robot (in detail, a middle point between the first and second antennas 710b and 720b).

As another example, when the antenna 710a of the first mobile robot is provided at the rear side r1 of the first mobile robot, the relative position of the first mobile robot 100b determined by the control unit 1800 of the second mobile robot 100b may indicate a relative position of the rear side r1 of the first mobile robot with respect to the second mobile robot (in detail, a middle point between the first and second antennas 710b and 720b).

The relative position of the first mobile robot described in this specification may refer to a relative position of a point where the one antenna 710a of the first mobile robot is located.

On the other hand, when the antenna 710a of the first mobile robot is provided at the center of the first mobile robot, the signals (the first signal and the second signal) transmitted and received through the antenna 710a of the first mobile robot may pass through the main body of the first mobile robot.

Since the antenna 710a of the first mobile robot is disposed at the center of the first mobile robot and the first mobile robot 100a is formed in a cylindrical shape, signals may pass through the first mobile robot (or the first mobile robot main body) by the same/similar length(s) based on omnidirectional positions of the antenna 710a of the first mobile robot.

Accordingly, the intensity of the signal reduced due to passing through the first mobile robot (or first mobile robot main body) 100a may not be considered in the first and second antennas 710b and 720b of the second mobile robot.

On the other hand, when the antenna 710a of the first mobile robot is provided on the rear area (or rear side) r1 of the first mobile robot 100a, the intensity of the signal received in the first and second antennas 710b and 720b of the second mobile robot may differ depending on directions that the first mobile robot 100a and the second mobile robot 100b face and an arrangement relationship of them.

FIG. 12 is a conceptual view illustrating a case where the second mobile robot determines an arrangement relationship with the first mobile robot based on intensity of a signal when the antenna of the first mobile robot is disposed on the rear side of the first mobile robot.

Description given with reference to FIGS. 7A to 11 may be applied to the embodiment of FIG. 12 in the same or similar manner.

The control unit of the second mobile robot 100b may determine the arrangement state of the first mobile robot 100b and the second mobile robot 100b, based on the intensity of the signal received through the first antenna 710*b* and the second antenna 720*b* provided in the second mobile robot 100*b*.

Specifically, when the antenna 710*a* of the first mobile robot is provided on the rear side r1 of the first mobile robot 100*a* and the first and second antennas 710*b* and 720*b* of the second mobile robot are provided on the front areas f1 and f2 of the second mobile robot 100*a*, the control unit 1800 of the second mobile robot 100*b* may determine the arrangement state of the first and second mobile robots 100*a* and 100*b* (positions at which the first and second mobile robots 100*a* and 100*b* are located and directions that they face, or the arrangement relationship of the first and second mobile robots 100*a* and 100*b*), based on the intensity of the signal received through the first and second antennas 710*b* and 720*b*.

For example, as illustrated in (a) of FIG. 12, when the first mobile robot 100*a* is located at the front of the second mobile robot 100*b* and the first mobile robot 100*a* and the second mobile robot 100*b* face the same direction (i.e., the front side (or front area) F1 of the first mobile robot 100*a* and the front side (or front area) F2 of the second mobile robot 100*b* face the same direction), the first and second antennas 710*b* and 720*b* may receive a signal output from the antenna 710*a* of the first mobile robot without passing through the first mobile robot 100*a* and the second mobile robot 100*b*. Accordingly, intensity of the signal may have a first value (first intensity) which is the largest value.

The control unit 1800 of the second mobile robot 100*b* may determine that the first mobile robot 100*a* is located at the front of the second mobile robot 100*b* and the first mobile robot 100*a* and the second mobile robot 100*b* face the same direction, on the basis of the fact that the intensity of the signal received through the first and second antennas 710*b* and 720*b* is the first value.

As another example, as illustrated in (b) of FIG. 12, when the first mobile robot 100*a* is located at the front of the second mobile robot 100*b* and the first mobile robot 100*a* and the second mobile robot 100*b* face each other (i.e., the front side (or front area) F1 of the first mobile robot 100*a* and the front side (or front area) F2 of the second mobile robot 100*b* face opposite directions from each other), the first and second antennas 710*b* and 720*b* may receive the signal output from the antenna 710*a* of the first mobile robot through the first mobile robot 100*a* by a predetermined length 1200*a*. The signal may not pass through the second mobile robot 100*b*. Accordingly, the intensity of the signal may have a second value (second intensity) which may be smaller than the first value.

The control unit 1800 of the second mobile robot 100*b* may determine that the first mobile robot 100*a* is located at the front of the second mobile robot 100*b* and the first mobile robot 100*a* and the second mobile robot 100*b* face each other, on the basis of the fact that the intensity of the signal received through the first and second antennas 710*b* and 720*b* is the second value.

As another example, as illustrated in (c) of FIG. 12, when the first mobile robot 100*a* is located at the rear of the second mobile robot 100*b* and the first mobile robot 100*a* and the second mobile robot 100*b* face opposite directions from each other (i.e., the front side (or front area) F1 of the first mobile robot 100*a* and the front side (or front area) F2 of the second mobile robot 100*b* face opposite directions from each other), the first and second antennas 710*b* and 720*b* may receive the signal output from the antenna 710*a* of the first mobile robot through the second mobile robot 100*b* by a predetermined length 1200*b*. The signal may pass through the first mobile robot 100*a*. Accordingly, the intensity of the signal may have a third value (third intensity) which may be smaller than the first value.

The control unit 1800 of the second mobile robot 100*b* may determine that the first mobile robot 100*a* is located at the rear of the second mobile robot 100*b* and the first mobile robot 100*a* and the second mobile robot 100*b* face different directions from each other, on the basis of the fact that the intensity of the signal received through the first and second antennas 710*b* and 720*b* is the third value.

The second value and the third value may be determined by experimental values. The second value and the third value may also vary depending on the sizes of the first and second mobile robots 100*a* and 100*b*, the materials of the first and second mobile robots, and the like.

This is because the signal intensity differs depending on the characteristics of the first and second mobile robot main bodies, which may reduce the signal intensity because the signal may pass through only one main body of the first and second mobile robots.

For example, when the first mobile robot 100*a* is larger than the second mobile robot 100*b*, the intensity (second value) of the signal which has passed through the main body of the first mobile robot 100*a* may be weaker than the intensity (third value) of the signal which has passed through the main body of the second mobile robot 100*b*.

As another example, as illustrated in (d) of FIG. 12, when the first mobile robot 100*a* is located at the rear of the second mobile robot 100*b* and the first mobile robot 100*a* and the second mobile robot 100*b* face the same direction (i.e., the front side (or front area) F1 of the first mobile robot 100*a* and the front side (or front area) F2 of the second mobile robot 100*b* face the same direction), the first and second antennas 710*b* and 720*b* may receive the signal output from the antenna 710*a* of the first mobile robot through the first mobile robot 100*a* by a predetermined length 1200*d* and through the second mobile robot 100*b* by a predetermined length 1200*c*. Accordingly, the intensity of the signal may have a fourth value (fourth intensity) which is smaller than the first value, the second value and the third value.

The control unit 1800 of the second mobile robot 100*b* may determine that the first mobile robot 100*a* is located at the rear of the second mobile robot 100*b* and the first mobile robot 100*a* and the second mobile robot 100*b* face the same direction, on the basis of the fact that the intensity of the signal received through the first and second antennas 710*b* and 720*b* is the fourth value.

The description that the first mobile robot 100*a* and the second mobile robot 100*b* face a direction(s) may mean that the front side of the first mobile robot 100*a* and the front side of the second mobile robot 100*b* face the direction(s).

When the first and second mobile robots 100*a* and 100*b* are arranged in the state shown in (a) of FIG. 12, ideal following travel can be performed.

On the other hand, when the first and second mobile robots 100*a* and 100*b* are arranged in the states shown in (b) to (d) of FIG. 12, the control unit 1800 of the second mobile robot 100*b* may control at least one of the second mobile robot 100*b* and the first mobile robot 100*a* to be in the state shown in (a) of FIG. 12.

For example, as shown in (b) of FIG. 12, when the first mobile robot 100*a* is located at the front of the second mobile robot 100*b* and the first mobile robot 100*a* and the second mobile robot 100*b* face each other, the control unit 1800 of the second mobile robot 100*b* may transmit a control signal to the first mobile robot 100*a* through the communication unit so that the first mobile robot 100*a* rotates in an opposite direction (180-degree direction).

As another example, as illustrated in (c) of FIG. 12, the first mobile robot 100*a* is located at the rear of the second mobile robot 100*b* and the first mobile robot 100*a* and the second mobile robot 100*b* face opposite directions, the control unit 1800 of the second mobile robot 100*b* may control the traveling unit 1300 such that the second mobile robot 100*b* is rotated in an opposite direction (180-degree direction).

As another example, as illustrated in (d) of FIG. 12, when the first mobile robot 100*a* is located at the rear of the second mobile robot 100*b* and the first mobile robot 100*a* and the second mobile robot 100*b* face the same direction, the control unit 1800 of the second mobile robot 100*b* may stop the movement of the second mobile robot 100*b* and transmit a control signal for controlling the first mobile robot 100*a* to pass ahead the second mobile robot 100*b* to the first mobile robot 100*a* through the communication unit 1100.

In addition, the control unit 1800 of the second mobile robot 100*b* may control the first mobile robot 100*a* and the second mobile robot 10*b* so that the first mobile robot 100*a* is located at the front of the second mobile robot 100*b* and the first mobile robot 100*a* and the second mobile robot 100*b* face the same direction, as illustrated in (a) of FIG. 12, which may allow the second mobile robot to smoothly follow the first mobile robot.

Even in the cases shown in (a) to (d) of FIG. 12, the control unit 1800 of the second mobile robot 100*b* may determine (recognize) the relative position of the first mobile robot 100*a* in real time or at predetermined intervals, by equally/similarly applying the description given with reference to FIGS. 7A to 11B.

In addition, the control unit 1800 of the second mobile robot 100*b* may transmit (or share) information related to the determined relative position of the first mobile robot 100*a* to (or with) the first mobile robot 100*a* through the communication unit.

Meanwhile, the second mobile robot 100*b* of the present disclosure may include two UWB anchors and two antennas, and determine the relative position of the first mobile robot 100*a* using only the two UWB anchors (or two antennas).

The control unit of the second mobile robot 100*b* may determine direction information (angle information) where the first mobile robot is located with respect to the forward direction of the second mobile robot, on the basis of a phase difference of signals received through the first antenna and the second antenna.

The first antenna and the second antenna may be connected to one UWB anchor or may be connected to different UWB anchors, respectively.

The second mobile robot 100*b* may include a first UWB anchor connected to the first antenna and a second UWB anchor connected to the second antenna.

The control unit of the second mobile robot 100*b* may determine direction information where the first mobile robot is located with respect to the forward direction of the second mobile robot on the basis of a phase difference between a signal received by the first UWB anchor through the first antenna and a signal received by the second UWB anchor through the second antenna.

The control unit of the second mobile robot 100*b* may calculate distance information up to the first mobile robot based on signals transmitted and received through the one antenna provided in the first mobile robot and at least one of the first antenna and the second antenna provided in the second mobile robot.

The control unit of the second mobile robot 100*b* may determine the relative position of the first mobile robot based on the calculated distance information and the direction information.

For example, the control unit of the second mobile robot 100*b* may determine direction information (angle information) where the first mobile robot 100*a* is located with respect to the forward direction of the second mobile robot 100*b*, using only two UWB anchors (or two antennas) other than three UWB anchors (or three antennas) in the aforementioned AoA manner.

To this end, the control unit of the second mobile robot 100*b* may receive a signal output from the UWB tag of the first mobile robot 100*a* through the first UWB anchor and the second UWB anchor (or the first antenna and the second antenna), respectively.

If a signal received through the first UWB anchor (first antenna) is a first signal and a signal received through the second UWB anchor (second antenna) is a second signal, the control unit of the second mobile robot 100*b* may determine a phase difference between the first signal and a second signal.

In addition, the control unit of the second mobile robot 100*b* may know information on a distance between the first UWB anchor and the second UWB anchor (or a distance between the first antenna and the second antenna) in advance. The distance may be a value preset at the time of manufacture.

The control unit of the second mobile robot may calculate angle information where the first mobile robot is located with respect to the forward direction of the second mobile robot based on the phase difference of the signals received in the first UWB anchor and the second UWB anchor (or the first and second antennas), and determine direction information where the first mobile robot is located with respect to the forward direction of the second mobile robot based on the calculated angle information.

On the other hand, the control unit of the second mobile robot 100*b* may calculate distance information up to the first mobile robot 100*a* based on a time for which the signals are transmitted and received between the first module (UWB tag) of the first mobile robot 100*a* and the second module (UWB anchors) of the second mobile robot 100*b*. That is, the control unit of the second mobile robot 100*b* may determine the distance information between the first mobile robot 100*a* and the second mobile robot 100*b* in the ToF manner.

The control unit of the second mobile robot 100*b* may determine the relative position of the first mobile robot based on the calculated distance information and the direction information.

The control unit of the second mobile robot 100*b* may determine the distance information through the ToF scheme and determine the direction information (or the angle information) through the AoA scheme.

The ToF scheme may need only one UWB tag and only one UWB anchor regardless of the number while the AoA scheme may need one UWB tag and at least two UWB anchors (or at least two antennas). Therefore, the first mobile robot 100*a* of the present disclosure may be provided with one UWB tag and the second mobile robot 100*b* may be provided with at least two UWB anchors (at least two antennas).

The description of the AoA method of recognizing the relative position of the first mobile robot 100*a* (in detail, the angle information (direction information) related to the first mobile robot 100*a*) using the two UWB anchors (or two antennas) may be equally/similarly applied even to a case of providing two antennas in one UWB anchor of the second mobile robot 100*b*.

When one UWB anchor has two antennas, the control unit of the second mobile robot 100*b* may receive a signal transmitted from the UWB tag of the first mobile robot 100*a* via each of the two antennas, and determine direction information (angle information) where the first mobile robot 100*a* is located with respect to the forward direction of the second mobile robot 100*b*, based on a phase difference of the received signal and a distance between the two antennas.

Meanwhile, when the second mobile robot 100*b* is provided with two UWB anchors, each of the two anchors may be connected to two antennas.

For example, two antennas may be connected to a first UWB anchor, and two antennas may be connected to a second UWB anchor.

The first UWB anchor and the second UWB anchor may be symmetrically disposed with respect to a blocking member formed to block the UWB signal. For example, the blocking member may be a case (or a camera) formed of a metal material, and the case (or camera) may be provided at a central portion of the front area on the main body of the second mobile robot 100*b*.

The first UWB anchor and the two antennas connected to the first UWB anchor may be provided at a left side with respect to the blocking member and the second UWB anchor and the two antennas connected to the second UWB anchor may be provided at a right side with respect to the blocking member.

The control unit of the second mobile robot 100*b* may determine a UWB anchor which has received the UWB signal, of the first UWB anchor and the second UWB anchor.

For example, when the UWB signal is received through the first UWB anchor, the control unit of the second mobile robot 100*b* may determine that the first mobile robot 100*a* is located at the right side with respect to the forward direction of the second mobile robot 100*b*.

As another example, when the UWB signal is received through the second UWB anchor, the control unit of the second mobile robot 100*b* may determine that the first mobile robot 100*a* is located at the right side with respect to the forward direction of the second mobile robot 100*b*.

Thereafter, the control unit of the second mobile robot 100*b* may receive the UWB signals respectively through the two antennas connected to the UWB anchor (for example, the first UWB anchor) in which the UWB signal has been sensed, and determine direction information (angle information) where the first mobile robot 100*a* is located with respect to the forward direction of the second mobile robot 100*b*, on the basis of a phase difference between the received UWB signals.

According to the present disclosure, the second mobile robot 100*b* may be provided with the two UWB anchors and each of the two anchors may be connected to the two antennas, so that the direction information (angle information) of the first mobile robot can be calculated with respect to the second mobile robot 100*b* in the AoA manner even when the second mobile robot 100*b* is provided with the blocking member, which may result in widening a range capable of receiving the UWB signals.

Accordingly, the present disclosure may have an effect of significantly increasing a recognition rate of the relative position of the first mobile robot.

The foregoing description may be applied to the method of controlling the mobile robot (second mobile robot) 100*b* in the same/similar manner.

For example, the method of controlling a mobile robot, in which a second mobile robot determines a relative position of a first mobile robot, may include determining a distance between an antenna of the first mobile robot and a first antenna of the second mobile robot and a distance between the antenna of the first mobile robot and a second antenna of the second mobile robot when a signal is received through the first antenna and the second antenna, determining two intersections of two circles that the decided distances are radii, respectively, and determining one of the two intersections as the relative position of the first mobile robot based on intensity of the signal received through the first antenna and the second antenna.

The present disclosure provides a plurality of autonomous mobile robots that a second mobile robot can accurately determine a relative position of a first mobile robot.

The present disclosure provides a plurality of new autonomous mobile robots, capable of reducing costs while improving accuracy in a manner that a second mobile robot determines a relative position of a first mobile robot using one UWB tag, one UWB anchor and the least antennas.

The present disclosure provides a plurality of new autonomous mobile robots, capable of accurately determining a relative position of a first mobile robot using only two receiving antennas, by use of the fact that a signal can be received through a main body and intensity of the signal can be attenuated.

The present disclosure may calculate two intersections through a UWB module using a UWB signal and the least antennas, so as to enable calculation of two accurate intersections and determination as to whether a first mobile robot is located at the front or rear of the second mobile robot based on intensity of a signal.

The present disclosure provides a plurality of autonomous mobile robots, capable of allowing smooth following by recognizing relative positions thereof irrespective of a communication state with a server because relative positions of a first mobile robot and a second mobile robot can be determined by the first and second mobile robots.

The functions/operations/control methods performed by the first mobile robot 100*a* disclosed herein may be performed by the control unit of the first mobile robot 100*a* or the control unit of the second mobile robot 100*b*, and the functions/operations/control methods performed by the second mobile robot 100*b* may be performed by the control unit of the second mobile robot 100*b* or the control unit of the first mobile robot 100*a*.

In addition, the present disclosure may allow the second mobile robot 100*b* to determine the relative position of the first mobile robot 100*a*.

Since the first mobile robot 100*a* may be the leading cleaner and the second mobile robot 100*b* may be the following cleaner following the first mobile robot 100*b*, the second mobile robot 100*b* can more easily follow the first mobile robot 100*a* by recognizing the relative position of the first mobile robot 100*a*, which may result in reducing accuracy of follow-up and calculation time of the relative position.

Since the first mobile robot may need to perform many calculations such as detecting an obstacle according to a preset algorithm, creating map information, determining a cleaning progress direction, and so on, such calculation load of the first mobile robot can be reduced as the second mobile robot recognizes the relative position of the first mobile robot.

In this specification, description has been given of the example in which the second mobile robot 100*b* may recognize the relative position of the first mobile robot 100a, but the present disclosure is not limited to this.

In general, when a plurality of autonomous mobile robots exist and their follow-up control is performed, the first mobile robot may determine the relative position of the second mobile robot so as to increase accuracy and rapidity because the specification (Spec) of components provided in the first mobile robot as the leading robot may be better than specification of components provided in the second mobile robot.

Accordingly, the present disclosure may allow the first mobile robot 100a to determine the relative position of the second mobile robot 100b.

To this end, the control unit of the second mobile robot 100b may transmit information (for example, information related to each of the antenna 710a of the first mobile robot and the first and second antennas 710b and 720b of the second mobile robot, output time information of a first signal, received time information of a second signal, delay time information (t_reply), or the like), calculated by the control unit of the second mobile robot 100b, to the first mobile robot 100a through the communication unit.

In this case, the control unit of the first mobile robot 100a may determine the relative position of the second mobile robot 100b (or the relative position of the first mobile robot 100a with respect to the second mobile robot 100b) based on the information received from the second mobile robot 100b through the communication unit.

In order to determine (decide) the relative position of the second mobile robot 100b, the first mobile robot 100a may include those components provided in the second mobile robot 100b and the second mobile robot 100b may include those components provided in the first mobile robot.

For example, the first mobile robot 100a may include first and second antennas and a UWB anchor, and the second mobile robot 100b may include one antenna and a UWB tag.

In this case, the control unit of the first mobile robot 100a may perform the functions/operations/control methods performed by the control unit of the second mobile robot 100b described in this specification, and the control unit of the second mobile robot 100b may perform the functions/operations/control methods performed by the control unit of the first mobile robot 100a.

Accordingly, the control unit of the first mobile robot 100a may determine the relative position of the second mobile robot 100b through the functions/operations/control methods performed by the control unit of the second mobile robot 100b.

When the first mobile robot 100a determines the relative position of the second mobile robot 100b, the first mobile robot 100a may transmit the determined relative position information of the second mobile robot 100b to the second mobile robot 100b. Further, the second mobile robot 100b may determine the relative position of the first mobile robot 100a based on the received relative position information of the second mobile robot.

Whether the first mobile robot 100a determines the relative position of the second mobile robot 100b or the second mobile robot 100b determines the relative position of the first mobile robot 100a may be decided at the time of product production, and may be determined/changed by user setting.

The present disclosure described above can be implemented as computer-readable codes on a program-recorded medium. The computer readable medium includes all kinds of recording devices in which data readable by a computer system is stored. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device and the like. In addition, the computer may also include the control unit 1800. The above detailed description should not be limitedly construed in all aspects and should be considered as illustrative. The scope of the present disclosure should be determined by rational interpretation of the appended claims, and all changes within the scope of equivalents of the present disclosure are included in the scope of the present disclosure.

What is claimed is:

1. A plurality of autonomous mobile robots, comprising:
a first mobile robot having an antenna configured to transmit and receive a signal; and
a second mobile robot having a first antenna and a second antenna disposed on a front area of a main body thereof, the first antenna and the second antenna being configured to transmit and receive signals to and from the antenna of the first mobile robot, and
wherein the second mobile robot comprises a control unit configured to determine a relative position of the first mobile robot using the signal received by the first antenna and the second antenna,
wherein the control unit of the second mobile robot is configured to:
determine a first distance between the antenna of the first mobile robot and the first antenna, based on the signal transmitted and received through the antenna of the first mobile robot and the first antenna of the second mobile robot,
determine a second distance between the antenna of the first mobile robot and the second antenna, based on the signal transmitted and received through the antenna of the first mobile robot and the second antenna of the second mobile robot, and
determine two intersections between a first circle and a second circle,
wherein a radius of the first circle corresponds to the first distance, and a center of the first circle corresponds to the first antenna, and
wherein a radius of the second circle corresponds to the second distance, and a center of the second circle corresponds to the second antenna.

2. The robots of claim 1, wherein the first antenna and the second antenna are disposed to be symmetric to each other in right and left directions with respect to the front area of the main body.

3. The robots of claim 1, wherein the first antenna and the second antenna are configured to receive signals transmitted in directions except for a direction traveling from the front area of the main body through the main body.

4. The robots of claim 1, wherein an intensity of the signal received in the first antenna or the second antenna is reduced when the signal is received through the main body.

5. The robots of claim 1, wherein an intensity of the signal received in the first antenna and the second antenna without passing through the main body after being output from the antenna of the first mobile robot is stronger than an intensity of the signal received in the first antenna and the second antenna through the main body after being output from the antenna of the first mobile robot.

6. The robots of claim 1, wherein the control unit of the second mobile robot is configured to:
output a first signal to the first mobile robot through at least one of the first antenna or the second antenna;

receive a second signal output from the antenna of the first mobile robot in each of the first antenna and the second antenna, and determine a first distance between the antenna of the first mobile robot and the first antenna and a second distance between the antenna of the first mobile robot and the second antenna when the second signal is received in each of the first antenna and the second antenna.

7. The robots of claim 1, wherein the control unit of the second mobile robot is configured to determine the relative position of the first mobile robot based on an intensity of the signal received through the first antenna and the second antenna.

8. The robots of claim 7, wherein the control unit of the second mobile robot is configured to:
  determine two intersections between a first circle and a second circle,
    wherein a radius of the first circle corresponds to a first distance between the antenna of the first mobile robot and the first antenna, and a center of the first circle corresponds to the first antenna, and
    wherein a radius of the second circle corresponds to a second distance between the antenna of the first mobile robot and the second antenna, and a center of the second circle corresponds to the second antenna, and
  determine an intersection located at a front of the second mobile robot of the two intersections as the relative position of the first mobile robot when the intensity of the signal received through the first antenna and the second antenna is equal to or greater than a reference value.

9. The robots of claim 8, wherein the control unit of the second mobile robot is configured to determine an intersection located at a rear of the second mobile robot of the two intersections as the relative position of the first mobile robot when the intensity of the signal received through the first antenna and the second antenna is smaller than the reference value.

10. The robots of claim 1, wherein the control unit of the second mobile robot is configured to determine a position of the antenna of the first mobile robot as the relative position of the first mobile robot.

11. The robots of claim 1, wherein the first mobile robot comprises an Ultra-Wideband (UWB) tag to transmit and receive a UWB signal, and
  wherein the antenna of the first mobile robot is electrically connected to the UWB tag.

12. The robots of claim 1, wherein the second mobile robot comprises an Ultra-Wideband (UWB) anchor to transmit and receive a UWB signal, and
  wherein the first antenna and the second antenna of the second mobile robot are electrically connected to the UWB anchor.

13. The robots of claim 1, wherein the control unit of the second mobile robot is configured to determine an arrangement state of the first mobile robot and the second mobile robot based on an intensity of the signal received through the first antenna and the second antenna.

14. The robots of claim 1, wherein the control unit of the second mobile robot is configured to determine a direction in which the first mobile robot is located with respect to a front of the second mobile robot, based on a phase difference of the signal received through the first antenna and the second antenna.

15. The robots of claim 1, wherein the second mobile robot comprises:
  a first Ultra-Wideband (UWB) anchor connected to the first antenna; and
  a second UWB anchor connected to the second antenna,
    wherein the control unit of the second mobile robot is configured to determine a direction in which the first mobile robot is located with respect to a front of the second mobile robot, based on a phase difference between a signal received by the first UWB anchor through the first antenna and a signal received by the second UWB anchor through the second antenna.

16. The robots of claim 15, wherein the control unit of the second mobile robot is configured to:
  calculate a distance to the first mobile robot, based on signals transmitted and received through at least one of the antenna of the first mobile robot, the first antenna of the second mobile robot, or the second antenna of the second mobile robot, and
  determine the relative position of the first mobile robot based on the calculated distance and the direction.

17. A method for controlling a mobile robot, the method comprising:
  determining, by a control unit of a mobile robot, a first distance between an antenna of the first mobile robot and a first antenna of the second mobile robot and a second distance between the antenna of the first mobile robot and a second antenna of the second mobile robot, respectively, when a signal is received through the first antenna and the second antenna of the second mobile robot;
  determining, by the control unit, two intersections between a first circle and a second circle, the first circle having the first distance as a radius and the second circle having the second distance as a radius; and
  determining, by the control unit, one of the two intersections as a relative position of the first mobile robot based on an intensity of the signal received in the first antenna and the second antenna.

* * * * *